US007613309B2

(12) United States Patent
Jones et al.

(10) Patent No.: US 7,613,309 B2
(45) Date of Patent: Nov. 3, 2009

(54) INTERFERENCE SUPPRESSION TECHNIQUES

(76) Inventors: Douglas L. Jones, 1214 W. Church St., Champaign, IL (US) 61821; Michael E. Lockwood, 604 E. Clark St., Apt. 3, Champaign, IL (US) 61820; Robert C. Bilger, Champaign, IL (US); Carolyn T. Bilger, legal representative, 1133 Newbury Rd., Champaign, IL (US) 61820; Albert S. Feng, 1209 Wilshire Ct., Champaign, IL (US) 61821; Charissa R. Lansing, 2903 Valley Brook Dr., Champaign, IL (US) 61821; William D. O'Brien, 2002 O'Donnell Dr., Champaign, IL (US) 61821; Bruce C. Wheeler, 1203 Waverly Dr., Champaign, IL (US) 61821; Mark Elledge, 1781 Spyglass Dr. #396, Austin, TX (US) 78746; Chen Liu, 4504 Waubansie La., Lisle, IL (US) 60532

( * ) Notice: Subject to any disclaimer, the term of this patent is extended or adjusted under 35 U.S.C. 154(b) by 1253 days.

(21) Appl. No.: 10/290,137

(22) Filed: Nov. 7, 2002

(65) Prior Publication Data

US 2003/0138116 A1 Jul. 24, 2003

Related U.S. Application Data

(63) Continuation of application No. PCT/US01/15047, filed on May 10, 2001, which is a continuation-in-part of application No. 09/568,430, filed on May 10, 2000, now abandoned.

(51) Int. Cl.
*H04B 15/00* (2006.01)

(52) U.S. Cl. ........................ 381/94.1; 381/313; 381/92

(58) Field of Classification Search ............... 381/94.1, 381/71.1, 313, 356, 312, 92, 94.2, 94.3, 71.6
See application file for complete search history.

(56) References Cited

U.S. PATENT DOCUMENTS 4,025,721 A 5/1977 Graupe et al.

(Continued)

FOREIGN PATENT DOCUMENTS

DE 28 23 798 B1 9/1979

(Continued)

OTHER PUBLICATIONS

B. Van Veen, "Minimum variance beamforming with soft response constraints," IEEE transactions on Signal Processing, Vo. 39, pp. 1964-1972, Sep. 1991.*

(Continued)

*Primary Examiner*—Vivian Chin
*Assistant Examiner*—Con P Tran
(74) *Attorney, Agent, or Firm*—L. Scott Paynter; Krieg DeVault LLP

(57) ABSTRACT

System (10) is disclosed including an acoustic sensor array (20) coupled to processor (42). System (10) processes inputs from array (20) to extract a desired acoustic signal through the suppression of interfering signals. The extraction/suppression is performed by modifying the array (20) inputs in the frequency domain with weights selected to minimize variance of the resulting output signal while maintaining unity gain of signals received in the direction of the desired acoustic signal. System (10) may be utilized in hearing aids, voice input devices, surveillance devices, and other applications.

33 Claims, 10 Drawing Sheets

U.S. PATENT DOCUMENTS

| | | | |
|---|---|---|---|
| 4,207,441 A | 6/1980 | Ricard et al. | |
| 4,304,234 A | 12/1981 | Hartman | |
| 4,304,235 A | 12/1981 | Kaufman | |
| 4,334,740 A | 6/1982 | Wray | |
| 4,354,064 A | 10/1982 | Scott | |
| 4,536,887 A | 8/1985 | Kaneda et al. | |
| 4,559,642 A | 12/1985 | Miyaji et al. | |
| 4,611,598 A | 9/1986 | Hortmann et al. | |
| 4,653,606 A * | 3/1987 | Flanagan | 181/145 |
| 4,703,506 A | 10/1987 | Sakamoto et al. | |
| 4,742,548 A | 5/1988 | Sessler et al. | |
| 4,752,961 A | 6/1988 | Kahn | |
| 4,773,095 A | 9/1988 | Zwicker et al. | |
| 4,790,019 A | 12/1988 | Hueber | |
| 4,845,755 A | 7/1989 | Busch et al. | |
| 4,858,612 A | 8/1989 | Stocklin | |
| 4,918,737 A | 4/1990 | Luethi | |
| 4,982,434 A | 1/1991 | Lenhardt et al. | |
| 4,987,897 A | 1/1991 | Funke | |
| 4,988,981 A | 1/1991 | Zimmerman et al. | |
| 5,012,520 A | 4/1991 | Steeger | |
| 5,029,216 A | 7/1991 | Jhabvala et al. | |
| 5,040,156 A | 8/1991 | Föller | |
| 5,047,994 A | 9/1991 | Lenhardt et al. | |
| 5,113,859 A | 5/1992 | Funke | |
| 5,245,556 A | 9/1993 | Morgan et al. | |
| 5,259,032 A | 11/1993 | Perkins et al. | |
| 5,285,499 A | 2/1994 | Shannon et al. | |
| 5,289,544 A | 2/1994 | Franklin | |
| 5,321,332 A | 6/1994 | Toda | |
| 5,325,436 A | 6/1994 | Soli et al. | |
| 5,383,915 A | 1/1995 | Adams | |
| 5,400,409 A | 3/1995 | Linhard | |
| 5,417,113 A | 5/1995 | Hartley | |
| 5,430,690 A | 7/1995 | Abel | |
| 5,454,838 A | 10/1995 | Vallana et al. | |
| 5,463,694 A | 10/1995 | Bradley et al. | |
| 5,473,701 A | 12/1995 | Cezanne et al. | |
| 5,479,522 A | 12/1995 | Lindemann et al. | |
| 5,485,515 A | 1/1996 | Allen et al. | |
| 5,495,534 A | 2/1996 | Inanaga et al. | |
| 5,507,781 A | 4/1996 | Kroll et al. | |
| 5,511,128 A | 4/1996 | Lindemann | |
| 5,550,923 A | 8/1996 | Hotvet | |
| 5,574,824 A * | 11/1996 | Slyh et al. | 704/226 |
| 5,627,799 A | 5/1997 | Hoshuyama | |
| 5,651,071 A | 7/1997 | Lindemann et al. | |
| 5,663,727 A | 9/1997 | Vokac | |
| 5,694,474 A | 12/1997 | Ngo et al. | |
| 5,706,352 A | 1/1998 | Engebretson et al. | |
| 5,715,319 A | 2/1998 | Chu | |
| 5,721,783 A | 2/1998 | Anderson | |
| 5,734,976 A | 3/1998 | Bartschi et al. | |
| 5,737,430 A | 4/1998 | Widrow | |
| 5,755,748 A | 5/1998 | Borza | |
| 5,757,932 A | 5/1998 | Lindemann et al. | |
| 5,768,392 A | 6/1998 | Graupe | |
| 5,793,875 A | 8/1998 | Lehr et al. | |
| 5,825,898 A | 10/1998 | Marash | |
| 5,831,936 A | 11/1998 | Zlotnick et al. | |
| 5,833,603 A | 11/1998 | Kovacs et al. | |
| 5,878,147 A | 3/1999 | Killion et al. | |
| 5,889,870 A | 3/1999 | Norris | |
| 5,991,419 A | 11/1999 | Brander | |
| 6,002,776 A | 12/1999 | Bhadkamkar et al. | |
| 6,010,532 A | 1/2000 | Kroll et al. | |
| 6,023,514 A | 2/2000 | Strandberg | |
| 6,068,589 A | 5/2000 | Neukermans | |
| 6,094,150 A | 7/2000 | Ohnishi et al. | |
| 6,104,822 A | 8/2000 | Melanson et al. | |
| 6,118,882 A | 9/2000 | Haynes | |
| 6,137,889 A | 10/2000 | Shennib et al. | |
| 6,141,591 A | 10/2000 | Lenarz et al. | |
| 6,154,552 A | 11/2000 | Koroljow et al. | |
| 6,160,757 A | 12/2000 | Täger et al. | |
| 6,161,046 A | 12/2000 | Maniglia et al. | |
| 6,167,312 A | 12/2000 | Goedeke | |
| 6,173,062 B1 | 1/2001 | Dibachi et al. | |
| 6,182,018 B1 | 1/2001 | Tran et al. | |
| 6,192,134 B1 | 2/2001 | White et al. | |
| 6,198,693 B1 | 3/2001 | Marash | |
| 6,217,508 B1 | 4/2001 | Ball et al. | |
| 6,222,927 B1 | 4/2001 | Feng et al. | |
| 6,223,018 B1 | 4/2001 | Fukumoto et al. | |
| 6,229,900 B1 | 5/2001 | Leenen | |
| 6,243,471 B1 | 6/2001 | Brandstein et al. | |
| 6,261,224 B1 | 7/2001 | Adams et al. | |
| 6,272,229 B1 | 8/2001 | Baekgaard | |
| 6,275,596 B1 | 8/2001 | Fretz et al. | |
| 6,283,915 B1 | 9/2001 | Aceti et al. | |
| 6,307,945 B1 | 10/2001 | Hall | |
| 6,317,703 B1 | 11/2001 | Linsker | |
| 6,327,370 B1 | 12/2001 | Killion et al. | |
| 6,332,028 B1 | 12/2001 | Marash | |
| 6,342,035 B1 | 1/2002 | Kroll et al. | |
| 6,380,896 B1 | 4/2002 | Berger et al. | |
| 6,385,323 B1 | 5/2002 | Zoels | |
| 6,389,142 B1 | 5/2002 | Hagen et al. | |
| 6,390,971 B1 | 5/2002 | Adams et al. | |
| 6,397,186 B1 | 5/2002 | Bush et al. | |
| 6,421,448 B1 | 7/2002 | Arndt et al. | |
| 6,424,721 B1 | 7/2002 | Hohn | |
| 6,717,991 B1 * | 4/2004 | Gustafsson et al. | 375/285 |
| 2001/0036284 A1 | 11/2001 | Leber | |
| 2001/0049466 A1 | 12/2001 | Leysieffer et al. | |
| 2001/0051776 A1 | 12/2001 | Lenhardt | |
| 2002/0029070 A1 | 3/2002 | Leysieffer et al. | |
| 2002/0141595 A1 | 10/2002 | Jouppi | |

FOREIGN PATENT DOCUMENTS

| | | | |
|---|---|---|---|
| DE | 33 22 108 | A1 | 12/1984 |
| EP | 0 802 699 | A2 | 10/1997 |
| EP | 0 802 699 | A3 | 10/1998 |
| WO | WO 98/26629 | | 6/1998 |
| WO | WO 00/30404 | | 5/2000 |
| WO | WO 01/06851 | A1 | 2/2001 |
| WO | PCT/US01/14945 | | 9/2001 |

OTHER PUBLICATIONS

Otis Lamont Frost III, "An Algorithm for linearly Constrained Adaptive Array Processing", Stanford University, Sanford, CA., (Aug. 1972).

Standler and Rabinowitz "On the Potential of Fixed Arrays for Hearing Aids", J. Scoust. Soc, Am 94 (3), Pt. I, (Sep. 1993).

Soede, Berkhout, Bilsen "Development of a Directional Hearing Instrument Based on Array Technology", J. Acoust. Soc, Am. 94 (2), Pt. 1, (Aug. 1993).

M. Bodden "Auditory Demonstrations of a Cocktail-Party-Processor" Acta Acustica. vol. 82, (1996).

Whitmal, Rutledge and Cohen "Reducing Correlated Noise in Digital Hearing Aids" IEEE Engineering in Medicine and Biology (Sep./Oct. 1996).

D. Banks "Localisation and Separation of Simultaneous Voices with Two Microphones" IEE (1993).

Bodden "Modeling Human Sound-Source Localization and the Cocktail-Party-Effect" Acta Acustica, vol. 1, (Feb./Apr. 1993).

Griffiths, Jim "An Alternative Approach to Linearly Constrained Adaptive Beamforming" IEEE Transactions on Antennas and Propagation, vol. AP-30, No. 1, (Jan. 1982).

Lindemann "Extension of a Binaural Cross-Correlation Model by. Contralateral Inhibition. I. Simulation of Lateralization for Stationary Signals" J. Acous. Soc. Am. 80 (6), (Dec. 1996).

Link, Buckley "Prewhitening for Intelligibility Gain in Hearing Aid Arrays" J. Acous. Soc. Am. 93 (4), Pt. 1, (Apr. 1993).

Hoffman, Trine, Buckley, Van Tasell, "Robust Adaptive Microphone Array Processing for Hearing Aids: Realistic Speech Enhancement" J. Acoust. Soc. Am. 96 (2), Pt. 1, (Aug. 1994).

Peissig, Kollmeier "Directivity of Binaural Noise Reduction in Spatial Multiple Noise-Source Arrangements for Normal and Impaired Listeners" J. Acoust. Soc. Am. 101 (3) (Mar. 1997).

Capon "High-Resolution Frequency-Wavenumber Spectrum Analysis" Proceedings of the IEEE, vol. 57, No. 8 (Aug. 1969).

Kollmeier, Peissig, Hohmann "Real-Time Multiband Dynamic Compression and Noise Reduction for Binaural Hearing Aids" Journal of Rehabilitation Research and Development, vol. 30, No. 1, (1993) pp. 82-94.

McDonough "Application of the Maximum-Likelihood Method and the Maximum-Entropy Method to Array Processing" Topics in Applied Physics, vol. 34.

Bell, Sejnowski "An Information-Maximization Approach to Blind Separation and Blind Deconvolution" Published by Massachusetts Institute of Technology (1995).

ARGOSystems, Inc. "An algorithm for linearly Constrained Adaptive Array Processing", Stanford University, Sanford, CA., (As early as Dec. 23, 1971).

T.G. Zimmerman, "Personal Area Networks: Near-field intrabody communication", (1996).

Cox, Henry et al., Practical Supergain, IEEE Transactions of Acoustics, Speech, and Signal Processing, Jun. 1986, vol. ASSP-34, No. 3.

Kates, James M., et al., A Comparison of Hearing-Aid Array-Processing Techniques, 1996 Acoustical Society of America, May 1996, V. 99, No. 5, pp. 3138-3148.

Cox, Henry, et al., Robust Adaptive Beamforming, IEEE Transactions on Acoustics, Speech, and Signal Processing, Oct. 1987, vol. ASSP-35, No. 10, pp. 1365-1376.

* cited by examiner

Algorithm Beamwidth for Various Regularization Values

INTERFERENCE SUPPRESSION TECHNIQUES

CROSS-REFERENCE TO RELATED APPLICATIONS

The present application is a continuation of International Patent Application No. PCT/US01/15047, which is a continuation-in-part of U.S. patent application Ser. No. 09/568,430 filed on May 10, 2000, now abandoned and is related to: U.S. patent application Ser. No. 09/193,058 filed on 16 Nov. 1998, which is a continuation-in-part of U.S. patent application Ser. No. 08/666,757 filed Jun. 19, 1996 (now U.S. Pat. No. 6,222, 927 B1); U.S. patent application Ser. No. 09/568,435 filed on May 10, 2000; and U.S. patent application Ser. No. 09/805, 233 filed on Mar. 13, 2001, which is a continuation of International Patent Application Number PCT/US99/26965, all of which are hereby incorporated by reference.

GOVERNMENT RIGHTS

The U.S. Government has a paid-up license in this invention and the right in limited circumstances to require the patent owner to license others on reasonable terms as provided for by DARPA Contract Number ARMY SUNY240-6762A and National Institutes of Health Contract Number R21DC04840.

BACKGROUND OF THE INVENTION

The present invention is directed to the processing of acoustic signals, and more particularly, but not exclusively, relates to techniques to extract an acoustic signal from a selected source while suppressing interference from other sources using two or more microphones.

The difficulty of extracting a desired signal in the presence of interfering signals is a long-standing problem confronted by acoustic engineers. This problem impacts the design and construction of many kinds of devices such as systems for voice recognition and intelligence gathering. Especially troublesome is the separation of desired sound from unwanted sound with hearing aid devices. Generally, hearing aid devices do not permit selective amplification of a desired sound when contaminated by noise from a nearby source. This problem is even more severe when the desired sound is a speech signal and the nearby noise is also a speech signal produced by other talkers. As used herein, "noise" refers not only to random or nondeterministic signals, but also to undesired signals and signals interfering with the perception of a desired signal.

SUMMARY OF THE INVENTION

One form of the present invention includes a unique signal processing technique using two or more microphones. Other forms include unique devices and methods for processing acoustic signals.

Further embodiments, objects, features, aspects, benefits, forms, and advantages of the present invention shall become apparent from the detailed drawings and descriptions provided herein.

DESCRIPTION OF SELECTED EMBODIMENTS

Figure 1:
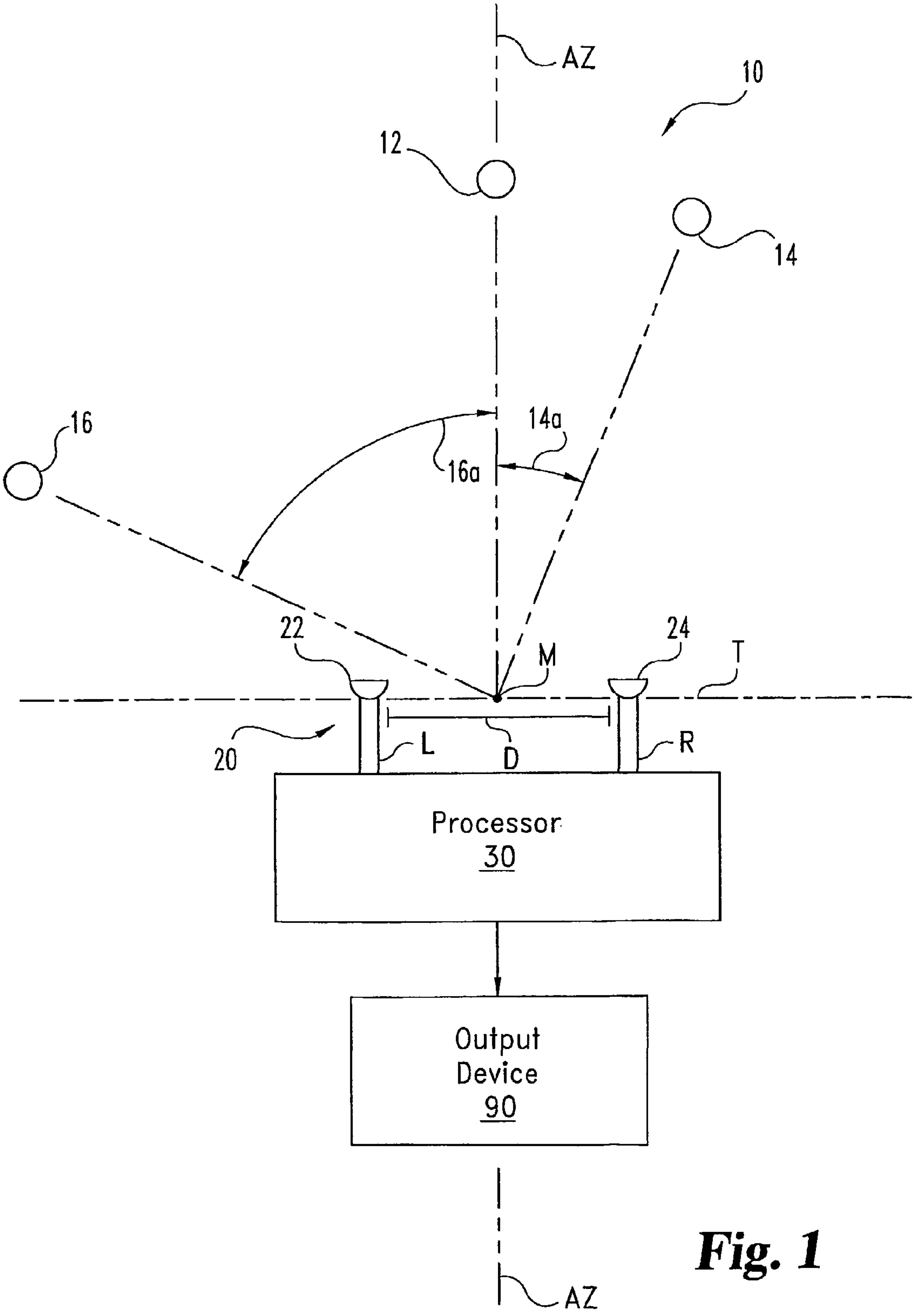
FIG. 1 is a diagrammatic view of a signal processing system.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

FIG. 1 illustrates an acoustic signal processing system 10 of one embodiment of the present invention. System 10 is configured to extract a desired acoustic excitation from acoustic source 12 in the presence of interference or noise from other sources, such as acoustic sources 14, 16. System 10 includes acoustic sensor array 20. For the example illustrated, sensor array 20 includes a pair of acoustic sensors 22, 24 within the reception range of sources 12, 14, 16. Acoustic sensors 22, 24 are arranged to detect acoustic excitation from sources 12, 14, 16.

Sensors 22, 24 are separated by distance D as illustrated by the like labeled line segment along lateral axis T. Lateral axis T is perpendicular to azimuthal axis AZ. Midpoint M represents the halfway point along distance D from sensor 22 to sensor 24. Axis AZ intersects midpoint M and acoustic source 12. Axis AZ is designated as a point of reference (zero degrees) for sources 12, 14, 16 in the azimuthal plane and for sensors 22, 24. For the depicted embodiment, sources 14, 16 define azimuthal angles 14*a*, 16*a* relative to axis AZ of about +22° and −65°, respectively. Correspondingly, acoustic source 12 is at 0° relative to axis AZ. In one mode of operation of system 10, the "on axis" alignment of acoustic source 12 with axis AZ selects it as a desired or target source of acoustic excitation to be monitored with system 10. In contrast, the "off-axis" sources 14, 16 are treated as noise and suppressed by system 10, which is explained in more detail hereinafter. To adjust the direction being monitored, sensors 22, 24 can be moved to change the position of axis AZ. In an additional or alternative operating mode, the designated monitoring direction can be adjusted by changing a direction indicator incorporated in the routine of FIG. 3 as more fully described below. For these operating modes, it should be understood that neither sensor 22 nor 24 needs to be moved to change the designated monitoring direction, and the designated monitoring direction need not be coincident with axis AZ.

In one embodiment, sensors 22, 24 are omnidirectional dynamic microphones. In other embodiments, a different type of microphone, such as cardioid or hypercardioid variety could be utilized, or such different sensor type can be utilized as would occur to one skilled in the art. Also, in alternative embodiments more or fewer acoustic sources at different azimuths may be present; where the illustrated number and arrangement of sources 12, 14, 16 is provided as merely one of many examples. In one such example, a room with several groups of individuals engaged in simultaneous conversation may provide a number of the sources.

Sensors 22, 24 are operatively coupled to processing subsystem 30 to process signals received therefrom. For the convenience of description, sensors 22, 24 are designated as belonging to left channel L and right channel R, respectively. Further, the analog time domain signals provided by sensors 22, 24 to processing subsystem 30 are designated $x_L(t)$ and $x_R(t)$ for the respective channels L and R. Processing subsystem 30 is operable to provide an output signal that suppresses interference from sources 14, 16 in favor of acoustic excitation detected from the selected acoustic source 12 positioned along axis AZ. This output signal is provided to output device 90 for presentation to a user in the form of an audible or visual signal which can be further processed.

Figure 2:
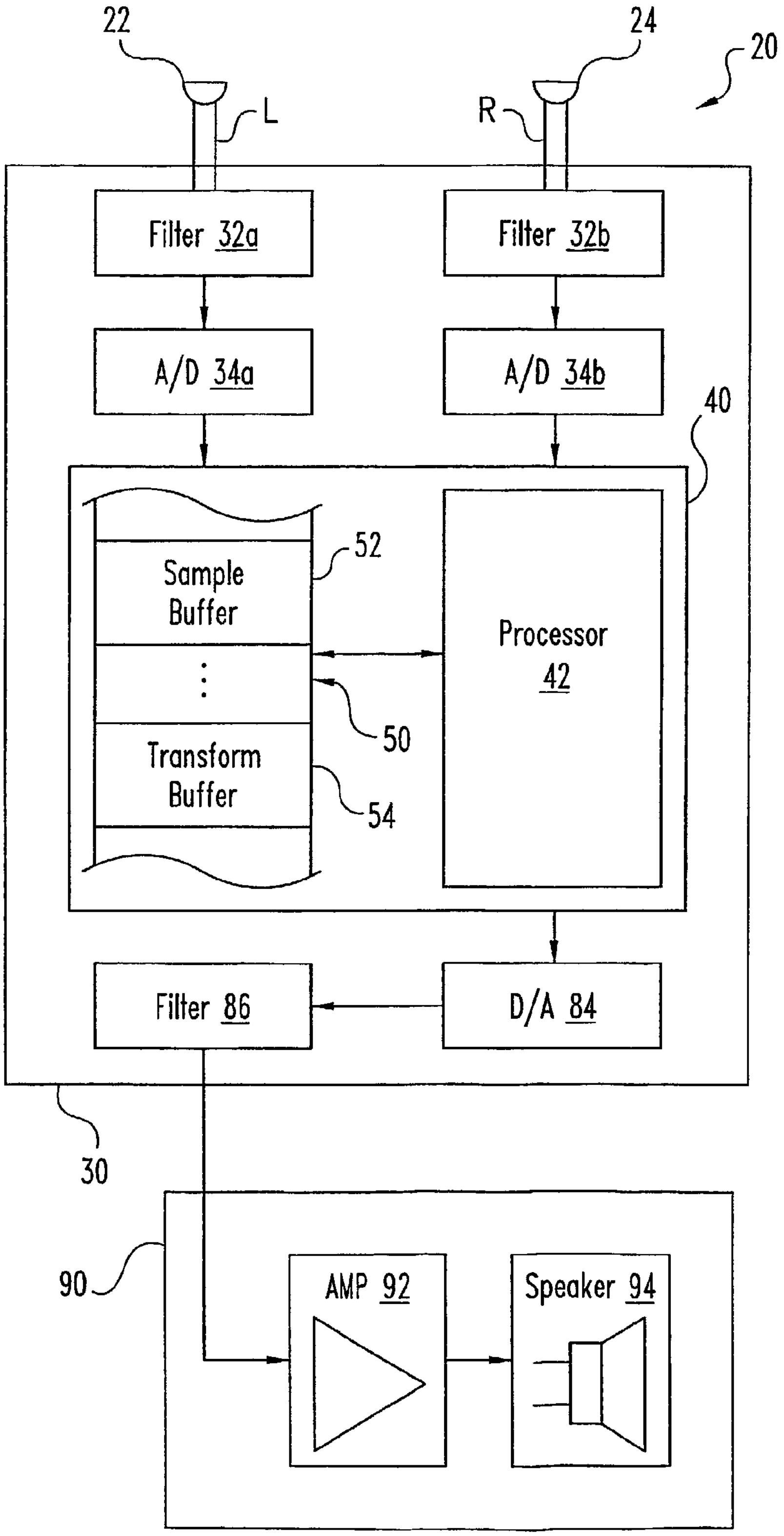
FIG. 2 is a diagram further depicting selected aspects of the system of FIG. 1.

Referring additionally to FIG. 2, a diagram is provided that depicts other details of system 10. Processing subsystem 30 includes signal conditioner/filters 32*a* and 32*b* to filter and condition input signals $x_L(t)$ and $x_R(t)$ from sensors 22, 24; where t represents time. After signal conditioner/filter 32*a* and 32*b*, the conditioned signals are input to corresponding Analog-to-Digital (A/D) converters 34*a*, 34*b* to provide discrete signals $x_L(z)$ and $x_R(Z)$, for channels L and R, respectively; where z indexes discrete sampling events. The sampling rate $f_S$ is selected to provide desired fidelity for a frequency range of interest. Processing subsystem 30 also includes digital circuitry 40 comprising processor 42 and memory 50. Discrete signals $x_L(z)$ and $x_R(z)$ are stored in sample buffer 52 of memory 50 in a First-In-First-Out (FIFO) fashion.

Processor 42 can be a software or firmware programmable device, a state logic machine, or a combination of both programmable and dedicated hardware. Furthermore, processor 42 can be comprised of one or more components and can include one or more Central Processing Units (CPUs). In one embodiment, processor 42 is in the form of a digitally programmable, highly integrated semiconductor chip particularly suited for signal processing. In other embodiments, processor 42 may be of a general purpose type or other arrangement as would occur to those skilled in the art.

Likewise, memory 50 can be variously configured as would occur to those skilled in the art. Memory 50 can include one or more types of solid-state electronic memory, magnetic memory, or optical memory of the volatile and/or nonvolatile variety. Furthermore, memory can be integral with one or more other components of processing subsystem 30 and/or comprised of one or more distinct components.

Processing subsystem 30 can include any oscillators, control clocks, interfaces, signal conditioners, additional filters, limiters, converters, power supplies, communication ports, or other types of components as would occur to those skilled in the art to implement the present invention. In one embodiment, subsystem 30 is provided in the form of a single microelectronic device.

Figure 3:
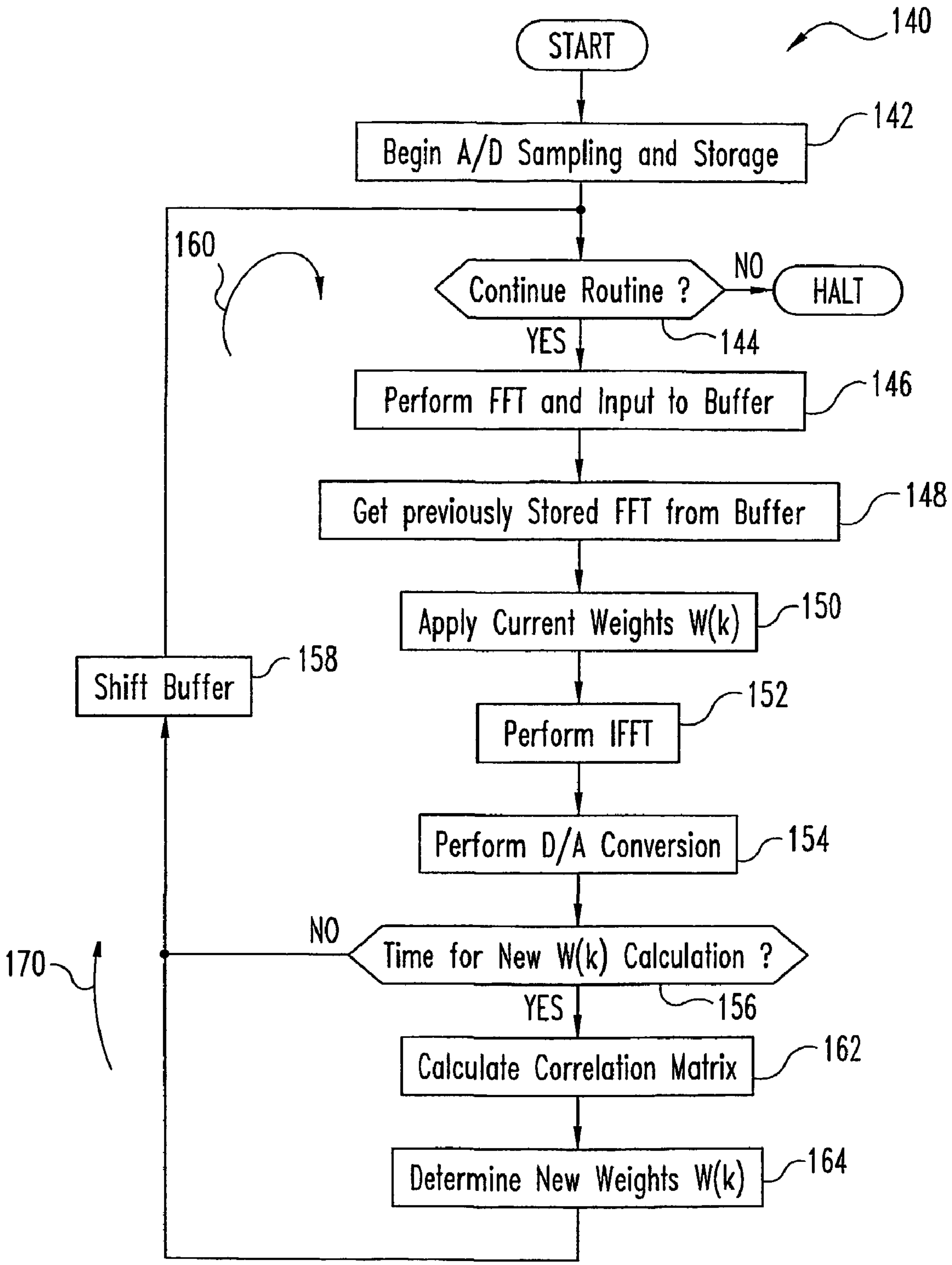
FIG. 3 is a flow chart of a routine for operating the system of FIG. 1.

Referring also to the flow chart of FIG. 3, routine 140 is illustrated. Digital circuitry 40 is configured to perform routine 140. Processor 42 executes logic to perform at least some the operations of routine 140. By way of nonlimiting example, this logic can be in the form of software programming instructions, hardware, firmware, or a combination of these. The logic can be partially or completely stored on memory 50 and/or provided with one or more other components or devices. By way of nonlimiting example, such logic can be provided to processing subsystem 30 in the form of signals that are carried by a transmission medium such as a computer network or other wired and/or wireless communication network.

In stage 142, routine 140 begins with initiation of the A/D sampling and storage of the resulting discrete input samples $x_L(z)$ and $x_R(z)$ in buffer 52 as previously described. Sampling is performed in parallel with other stages of routine 140 as will become apparent from the following description. Routine 140 proceeds from stage 142 to conditional 144. Conditional 144 tests whether routine 140 is to continue. If not, routine 140 halts. Otherwise, routine 140 continues with stage 146. Conditional 144 can correspond to an operator switch, control signal, or power control associated with system 10 (not shown).

In stage 146, a fast discrete fourier transform (FFT) algorithm is executed on a sequence of samples $x_L(z)$ and $x_R(z)$ and stored in buffer 54 for each channel L and R to provide corresponding frequency domain signals $x_L(k)$ and $x_R(k)$; where k is an index to the discrete frequencies of the FFTs (alternatively referred to as "frequency bins" herein). The set of samples $x_L(z)$ and $x_R(z)$ upon which an FFT is performed can be described in terms of a time duration of the sample data. Typically, for a given sampling rate $f_S$, each FFT is based on more than 100 samples. Furthermore, for stage 146, FFT calculations include application of a windowing technique to the sample data. One embodiment utilizes a Hamming window. In other embodiments, data windowing can be absent or a different type utilized, the FFT can be based on a different sampling approach, and/or a different transform can be employed as would occur to those skilled in the art. After the transformation, the resulting spectra $x_L(k)$ and $x_R(k)$ are stored in FFT buffer 54 of memory 50. These spectra are generally complex-valued.

It has been found that reception of acoustic excitation emanating from a desired direction can be improved by weighting and summing the input signals in a manner arranged to minimize the variance (or equivalently, the energy) of the resulting output signal while under the constraint that signals from the desired direction are output with a predetermined gain. The following relationship (1) expresses this linear combination of the frequency domain input signals:

$$Y(k)=W^*_L(k)X_L(k)+W^*_R(k)X_R(k)=W^H(k)X(k); \qquad (1)$$

where:

$$W(k)=\begin{bmatrix} W_L(k) \\ W_R(k) \end{bmatrix}; \qquad X(k)=\begin{bmatrix} X_L(k) \\ X_R(k) \end{bmatrix};$$

Y(k) is the output signal in frequency domain form, $W_L(k)$ and $W_R(k)$ are complex valued multipliers (weights) for each frequency k corresponding to channels L and R, the superscript "*" denotes the complex conjugate operation, and the superscript "H" denotes taking the Hermitian of a vector. For this approach, it is desired to determine an "optimal" set of weights $W_L(k)$ and $W_R(k)$ to minimize variance of Y(k). Minimizing the variance generally causes cancellation of sources not aligned with the desired direction. For the mode of operation where the desired direction is along axis AZ, frequency components which do not originate from directly ahead of the array are attenuated because they are not consistent in phase across the left and right channels L, R, and therefore have a larger variance than a source directly ahead. Minimizing the variance in this case is equivalent to minimizing the output power of off-axis sources, as related by the optimization goal of relationship (2) that follows:

$$\underset{W}{\text{Min}}\; E\{|Y(k)|^2\} \tag{2}$$

where Y(k) is the output signal described in connection with relationship (1). In one form, the constraint requires that "on axis" acoustic signals from sources along the axis AZ be passed with unity gain as provided in relationship (3) that follows:

$$e^H W(k)=1 \tag{3}$$

Here e is a two element vector which corresponds to the desired direction. When this direction is coincident with axis AZ, sensors 22 and 24 generally receive the signal at the same time and amplitude, and thus, for source 12 of the illustrated embodiment, the vector e is real-valued with equal weighted elements—for instance $e^H=[0.5\ 0.5]$. In contrast, if the selected acoustic source is not on axis AZ, then sensors 22, 24 can be moved to align axis AZ with it.

In an additional or alternative mode of operation, the elements of vector e can be selected to monitor along a desired direction that is not coincident with axis AZ. For such operating modes, vector e becomes complex-valued to represent the appropriate time/phase delays between sensors 22, 24 that correspond to acoustic excitation off axis AZ. Thus, vector e operates as the direction indicator previously described. Correspondingly, alternative embodiments can be arranged to select a desired acoustic excitation source by establishing a different geometric relationship relative to axis AZ. For instance, the direction for monitoring a desired source can be disposed at a nonzero azimuthal angle relative to axis AZ. Indeed, by changing vector e, the monitoring direction can be steered from one direction to another without moving either sensor 22, 24. Procedure 520 described in connection with the flowchart of FIG. 10 hereinafter provides an example of a localization/tracking routine that can be used in conjunction with routine 140 to steer vector e.

For inputs $X_L(k)$ and $X_R(k)$ that generally correspond to stationary random processes (which is typical of speech signals over small periods of time), the following weight vector W(k) relationship (4) can be determined from relationships (2) and (3):

$$W(k)=\frac{R(k)^{-1}e}{e^H R(k)^{-1}e} \tag{4}$$

where e is the vector associated with the desired reception direction, R(k) is the correlation matrix for the kth frequency, W(k) is the optimal weight vector for the $k^{th}$ frequency and the superscript "−1" denotes the matrix inverse. The derivation of this relationship is explained in connection with a general model of the present invention applicable to embodiments with more than two sensors 22, 24 in array 20.

The correlation matrix R(k) can be estimated from spectral data obtained via a number "F" of fast discrete Fourier transforms (FFTs) calculated over a relevant time interval. For the two channel L, R embodiment, the correlation matrix for the $k^{th}$ frequency, R(k), is expressed by the following relationship (5):

$$R(k)=\begin{bmatrix}\frac{M}{F}\sum_{n=1}^{F}X_l^*(n,k)X_l(n,k) & \frac{1}{F}\sum_{n=1}^{F}X_l^*(n,k)X_r(n,k)\\ \frac{1}{F}\sum_{n=1}^{F}X_r^*(n,k)X_l(n,k) & \frac{M}{F}\sum_{n=1}^{F}X_r^*(n,k)X_r(n,k)\end{bmatrix}=\begin{bmatrix}X_{ll}(k) & X_{lr}(k)\\ X_{rl}(k) & X_{rr}(k)\end{bmatrix} \tag{5}$$

where $X_l$ is the FFT in the frequency buffer for the left channel L and $X_r$ is the FFT in the frequency buffer for right channel R obtained from previously stored FFTs that were calculated from an earlier execution of stage 146; "n" is an index to the number "F" of FFTs used for the calculation; and "M" is a regularization parameter. The terms $X_{ll}(k)$, $X_{lr}(k)$, $X_{rl}(k)$, and $X_{rr}(k)$ represent the weighted sums for purposes of compact expression. It should be appreciated that the elements of the R(k) matrix are nonlinear, and therefore Y(k) is a nonlinear function of the inputs.

Accordingly, in stage 148 spectra $X_l(k)$ and $X_r(k)$ previously stored in buffer 54 are read from memory 50 in a First-In-First-Out (FIFO) sequence. Routine 140 then proceeds to stage 150. In stage 150, multiplier weights $W_L(k)$, $W_R(k)$ are applied to $X_l(k)$ and $X_r(k)$, respectively, in accordance with the relationship (1) for each frequency k to provide the output spectra Y(k). Routine 140 continues with stage 152 which performs an Inverse Fast Fourier Transform (FFT) to change the Y(k) FFT determined in stage 150 into a discrete time domain form designated y(z). Next, in stage 154, a Digital-to-Analog (D/A) conversion is performed with D/A converter 84 (FIG. 2) to provide an analog output signal y(t). It should be understood that correspondence between Y(k) FFTs and output sample y(z) can vary. In one embodiment, there is one Y(k) FFT output for every y(z), providing a one-to-one correspondence. In another embodiment, there may be one Y(k) FFT for every 16 output samples y(z) desired, in which case the extra samples can be obtained from available Y(k) FFTs. In still other embodiments, a different correspondence may be established.

After conversion to the continuous time domain form, signal y(t) is input to signal conditioner/filter 86. Conditioner/filter 86 provides the conditioned signal to output device 90. As illustrated in FIG. 2, output device 90 includes an amplifier 92 and audio output device 94. Device 94 may be a loudspeaker, hearing aid receiver output, or other device as would occur to those skilled in the art. It should be appreciated that system 10 processes a binaural input to produce an monaural output. In some embodiments, this output could be further processed to provide multiple outputs. In one hearing aid application example, two outputs are provided that deliver generally the same sound to each ear of a user. In another hearing aid application, the sound provided to each ear selectively differs in terms of intensity and/or timing to account for differences in the orientation of the sound source to each sensor 22, 24, improving sound perception.

After stage 154, routine 140 continues with conditional 156. In many applications it may not be desirable to recalculate the elements of weight vector W(k) for every Y(k). Accordingly, conditional 156 tests whether a desired time interval has passed since the last calculation of vector W(k). If this time period has not lapsed, then control flows to stage 158 to shift buffers 52, 54 to process the next group of signals. From stage 158, processing loop 160 closes, returning to conditional 144. Provided conditional 144 remains true, stage 146 is repeated for the next group of samples of $x_L(z)$ and $x_R(Z)$ to determine the next pair of $X_L(k)$ and $X_R(k)$ FFTs for storage in buffer 54. Also, with each execution of processing loop 160, stages 148, 150, 152, 154 are repeated to process previously stored $X_l(k)$ and $X_r(k)$ FFTs to determine the next Y(k) FFT and correspondingly generate a continuous y(t). In this manner buffers 52, 54 are periodically shifted in stage 158 with each repetition of loop 160 until either routine 140 halts as tested by conditional 144 or the time period of conditional 156 has lapsed.

If the test of conditional 156 is true, then routine 140 proceeds from the affirmative branch of conditional 156 to calculate the correlation matrix R(k) in accordance with relationship (5) in stage 162. From this new correlation matrix R(k), an updated vector W(k) is determined in accordance with relationship (4) in stage 164. From stage 164, update loop 170 continues with stage 158 previously described, and processing loop 160 is re-entered until routine 140 halts per conditional 144 or the time for another recalculation of vector W(k) arrives. Notably, the time period tested in conditional 156 may be measured in terms of the number of times loop 160 is repeated, the number of FFTs or samples generated between updates, and the like. Alternatively, the period between updates can be dynamically adjusted based on feedback from an operator or monitoring device (not shown).

When routine 140 initially starts, earlier stored data is not generally available. Accordingly, appropriate seed values may be stored in buffers 52, 54 in support of initial processing. In other embodiments, a greater number of acoustic sensors can be included in array 20 and routine 140 can be adjusted accordingly. For this more general form, the output can be expressed by relationship (6) as follows:

$$Y(k)=W^H(k)X(k) \quad (6)$$

where the X(k) is a vector with an entry for each of "C" number of input channels and the weight vector W(k) is of like dimension. Equation (6) is the same at equation (1) but the dimension of each vector is C instead of 2. The output power can be expressed by relationship (7) as follows:

$$E[Y(k)^2]=E[W(k)^H X(k)X^H(k)W(k)]=W(k)^H R(k)W(k) \quad (7)$$

where the correlation matrix R(k) is square with "C×C" dimensions. The vector e is the steering vector describing the weights and delays associated with a desired monitoring direction and is of the form provided by relationships (8) and (9) that follow:

$$e(\phi)=\frac{1}{C}[1\, e^{+j\phi k} \ldots e^{+j(C-1)\phi k}]^T \quad (8)$$

$$\phi=(2\pi Df_S/(cN))(\sin(\theta)) \text{ for } k=0, 1, \ldots, N-1 \quad (9)$$

where C is the number of array elements, c is the speed of sound in meters per second, and θ is the desired "look direction." Thus, vector e may be varied with frequency to change the desired monitoring direction or look-direction and correspondingly steer the array. With the same constraint regarding vector e as described by relationship (3), the problem can be summarized by relationship (10) as follows:

$$\underset{W(k)}{\text{Minimize}}\{W(k)^H R(k)W(k)\} \quad \text{such that } e^H W(k)=1 \quad (10)$$

This problem can be solved using the method of Lagrange multipliers generally characterized by relationship (11) as follows:

$$\underset{W(k)}{\text{Minimize}}\{CostFunction+\lambda*\text{Constraint}\} \quad (11)$$

where the cost function is the output power, and the constraint is as listed above for vector e. A general vector solution begins with the Lagrange multiplier function H(W) of relationship (12):

$$H(W)=\frac{1}{2}W(k)^H R(k)W(k)+\lambda(e^H W(k)-1) \quad (12)$$

where the factor of one half (½) is introduced to simplify later math. Taking the gradient of H(W) with respect to W(k), and setting this result equal to zero, relationship (13) results as follows:

$$\nabla_W H(W)=R(k)W(k)+e\lambda=0 \quad (13)$$

Also, relationship (14) follows:

$$W(k)=-R(k)^{-1}e\lambda \quad (14)$$

Using this result in the constraint equation relationships (15) and (16) that follow:

$$e^H[-R(k)^{-1}e\lambda]=1 \quad (15)$$

$$\lambda=-[e^H R(k)^{-1}e]^{-1} \quad (16)$$

and using relationship (14), the optimal weights are as set forth in relationship (17):

$$W_{opt}=R(k)^{-1}e[e^H R(k)^{-1}e]^{-1} \quad (17)$$

Because the bracketed term is a scalar, relationship (4) has this term in the denominator, and thus is equivalent.

Returning to the two variable case for the sake of clarity, relationship (5) may be expressed more compactly by absorbing the weighted sums into the terms $X_{ll}$, $X_{lr}$, $X_{rl}$ and $X_{rr}$, and then renaming them as components of the correlation matrix R(k) per relationship (18):

$$R(k)=\begin{bmatrix} X_{ll}(k) & X_{lr}(k) \\ X_{rl}(k) & X_{rr}(k) \end{bmatrix}=\begin{bmatrix} R_{11} & R_{12} \\ R_{21} & R_{22} \end{bmatrix} \quad (18)$$

Its inverse may be expressed in relationship (19) as:

$$R(k)^{-1} = \begin{bmatrix} R_{22} & -R_{12} \\ -R_{21} & R_{11} \end{bmatrix} * \frac{1}{det(R(k))} \tag{19}$$

where det( ) is the determinant operator. If the desired monitoring direction is perpendicular to the sensor array, e=[0.5 0.5]$^T$, the numerator of relationship (4) may then be expressed by relationship (20) as:

$$R(k)^{-1} e = \begin{bmatrix} R_{22} & -R_{12} \\ -R_{21} & R_{11} \end{bmatrix} \begin{bmatrix} 0.5 \\ 0.5 \end{bmatrix} * \frac{1}{det(R(k))} = \begin{bmatrix} R_{22} - R_{12} \\ R_{11} - R_{21} \end{bmatrix} * \frac{0.5}{det(R(k))} \tag{20}$$

Using the previous result, the denominator is expressed by relationship (21) as:

$$e^H R(k)^{-1} e = [0.5\ 0.5] * \begin{bmatrix} R_{22} - R_{12} \\ R_{11} - R_{21} \end{bmatrix} * \frac{1}{det(R(k))} = (R_{11} + R_{22} - R_{12} - R_{21}) * \frac{0.5}{det(R(k))} \tag{21}$$

Canceling out the common factor of the determinant, the simplified relationship (22) is completed as:

$$\begin{bmatrix} w_1 \\ w_2 \end{bmatrix} = \frac{1}{(R_{11} + R_{22} - R_{12} - R_{21})} * \begin{bmatrix} R_{22} - R_{12} \\ R_{11} - R_{21} \end{bmatrix} \tag{22}$$

It can also be expressed in terms of averages of the sums of correlations between the two channels in relationship (23) as:

$$\begin{bmatrix} w_l(k) \\ w_r(k) \end{bmatrix} = \frac{1}{(X_{ll}(k) + X_{rr}(k) - X_{lr}(k) - X_{rl}(k))} * \begin{bmatrix} X_{rr}(k) - X_{lr}(k) \\ X_{ll}(k) - X_{rl}(k) \end{bmatrix} \tag{23}$$

where $w_l(k)$ and $w_r(k)$ are the desired weights for the left and right channels, respectively, for the k$^{th}$ frequency, and the components of the correlation matrix are now expressed by relationships (24) as:

$$X_{ll}(k) = \frac{M}{F} \sum_{n=1}^{F} X_l^*(n, k) X_l(n, k) \tag{24}$$

$$X_{lr}(k) = \frac{1}{F} \sum_{n=1}^{F} X_l^*(n, k) X_r(n, k)$$

$$X_{rl}(k) = \frac{1}{F} \sum_{n=1}^{F} X_r^*(n, k) X_l(n, k)$$

$$X_{rr}(k) = \frac{M}{F} \sum_{n=1}^{F} X_r^*(n, k) X_r(n, k)$$

just as in relationship (5). Thus, after computing the averaged sums (which may be kept as running averages), computational load can be reduced for this two channel embodiment.

In a further variation of routine 140, a modified approach can be utilized in applications where gain differences between sensors of array 20 are negligible. For this approach, an additional constraint is utilized. For a two-sensor arrangement with a fixed on-axis steering direction and negligible inter-sensor gain differences, the desired weights satisfy relationship (25) as follows:

$$\mathrm{Re}[w_1] = \mathrm{Re}[w_2] = \frac{1}{2} \tag{25}$$

The variance minimization goal and unity gain constraint for this alternative approach correspond to the following relationships (26) and (27), respectively:

$$\min_{W_k} E\{|Y_k|^2\} \tag{26}$$

$$e^H \begin{bmatrix} \frac{1}{2} + \mathrm{Im}[w_1] \\ \frac{1}{2} + \mathrm{Im}[w_2] \end{bmatrix} = 1 \tag{27}$$

By inspection, when $e^H$=[1 1], relationship (27) reduces to relationship (28) as follows:

$$Im[w_1] = -Im[w_2] \tag{28}$$

Solving for desired weights subject to the constraint in relationship (27) and using relationship (28) results in the following relationship (29):

$$W_{opt} = \begin{bmatrix} \frac{1}{2} \\ \frac{1}{2} \end{bmatrix} + j \begin{bmatrix} \mathrm{Im}[R_{12}] \\ -\mathrm{Im}[R_{12}] \end{bmatrix} \cdot \frac{1}{2\mathrm{Re}[R_{12}] - R_{11} - R_{22}} \tag{29}$$

The weights determined in accordance with relationship (29) can be used in place of those determined with relationships (22), (23), and (24); where $R_{11}$, $R_{12}$, $R_{21}$, $R_{22}$, are the same as those described in connection with relationship (18). Under appropriate conditions, this substitution typically provides comparable results with more efficient computation. When relationship (29) is utilized, it is generally desirable for the target speech or other acoustic signal to originate from the on-axis direction and for the sensors to be matched to one another or to otherwise compensate for inter-sensor differences in gain. Alternatively, localization information about sources of interest in each frequency band can be utilized to steer sensor array 20 in conjunction with the relationship (29) approach. This information can be provided in accordance with procedure 520 more fully described hereinafter in connection with the flowchart of FIG. 10.

Referring to relationship (5), regularization factor M typically is slightly greater than 1.00 to limit the magnitude of the weights in the event that the correlation matrix R(k) is, or is close to being, singular, and therefore noninvertable. This occurs, for example, when time-domain input signals are exactly the same for F consecutive FFT calculations. It has been found that this form of regularization also can improve the perceived sound quality by reducing or eliminating processing artifacts common to time-domain beamformers.

Figure 9:
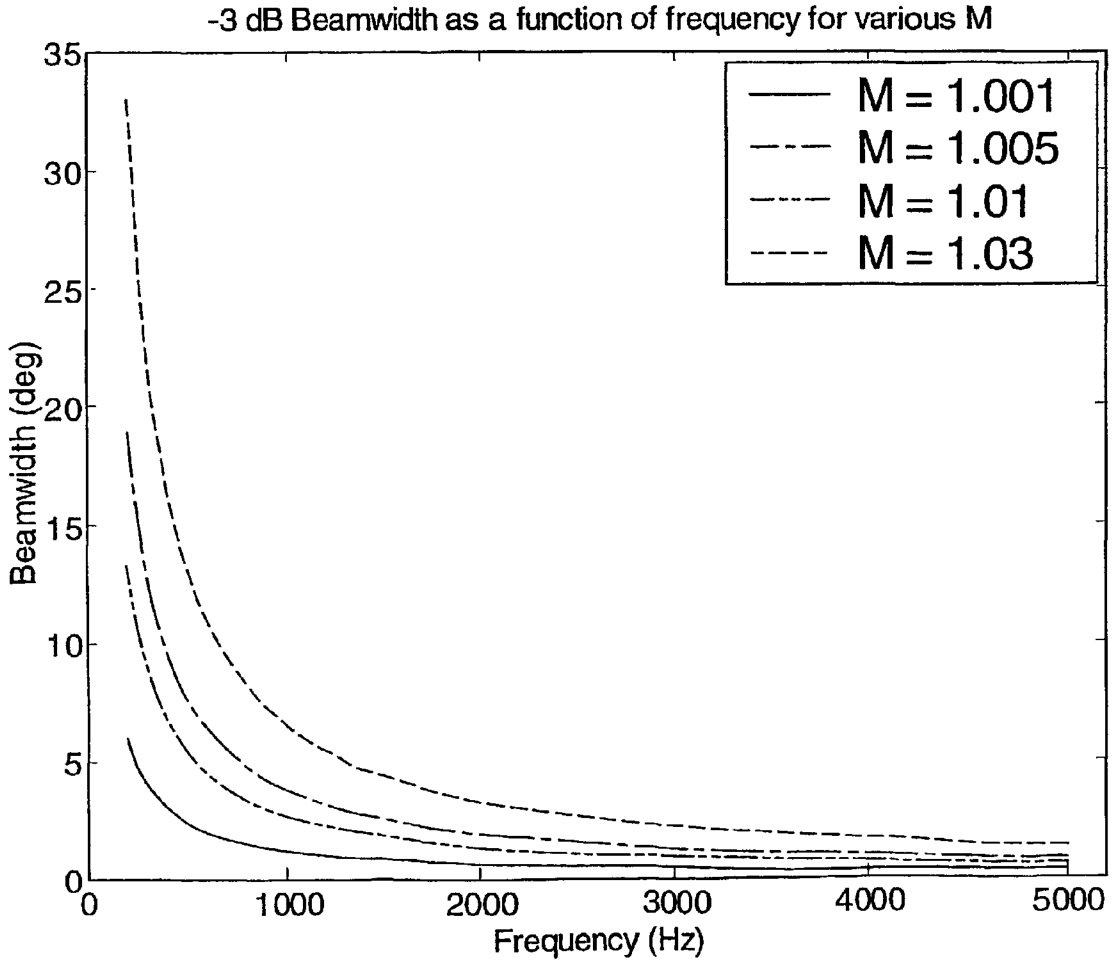
FIG. 9 is a graph providing line plots for regularization factor (M) values of 1.001, 1.005, 1.01, and 1.03 in terms of beamwidth versus frequency.

In one embodiment, regularization factor M is a constant. In other embodiments, regularization factor M can be used to adjust or otherwise control the array beamwidth, or the angular range at which a sound of a particular frequency can impinge on the array relative to axis AZ and be processed by routine 140 without significant attenuation. This beamwidth is typically larger at lower frequencies than higher frequencies, and can be expressed by the following relationship (30):

$$\text{Beamwidth}_{-3dB} = 2 \cdot \sin^{-1}\left( \frac{c \cdot \cos\left\lfloor 1 + r + \frac{r}{2}\left(r - \sqrt{r^2 + 4r + 8}\right) \right\rfloor}{2\pi \cdot f \cdot D} \right) \tag{30}$$

r=1−M, where M is the regularization factor, as in relationship (5), c represents the speed of sound in meters per second (m/s), f represents frequency in Hertz (Hz), D is the distance between microphones in meters (m). For relationship (30), $\text{Beamwidth}_{-3\,dB}$ defines a beamwidth that attenuates the signal of interest by a relative amount less than or equal to three decibels (dB). It should be understood that a different attenuation threshold can be selected to define beamwidth in other embodiments of the present invention. FIG. 9 provides a graph of four lines of different patterns to represent constant values 1.001, 1.005, 1.01, and 1.03, of regularization factor M, respectively, in terms of beamwidth versus frequency.

Per relationship (30), as frequency increases, beamwidth decreases; and as regularization factor M increases, the beamwidth increases. Accordingly, in one alternative embodiment of routine 140, regularization factor M is increased as a function of frequency to provide a more uniform beamwidth across a desired range of frequencies. In another embodiment of routine 140, M is alternatively or additionally varied as a function of time. For example, if little interference is present in the input signals in certain frequency bands, the regularization factor M can be increased in those bands. It has been found that beamwidth increases in frequency bands with low or no inference commonly provide a better subjective sound quality by limiting the magnitude of the weights used in relationships (22), (23), and/or (29). In a further variation, this improvement can be complemented by decreasing regularization factor M for frequency bands that contain interference above a selected threshold. It has been found that such decreases commonly provide more accurate filtering, and better cancellation of interference. In still another embodiment, regularization factor M varies in accordance with an adaptive function based on frequency-band-specific interference. In yet further embodiments, regularization factor M varies in accordance with one or more other relationships as would occur to those skilled in the art.

Figure 4:
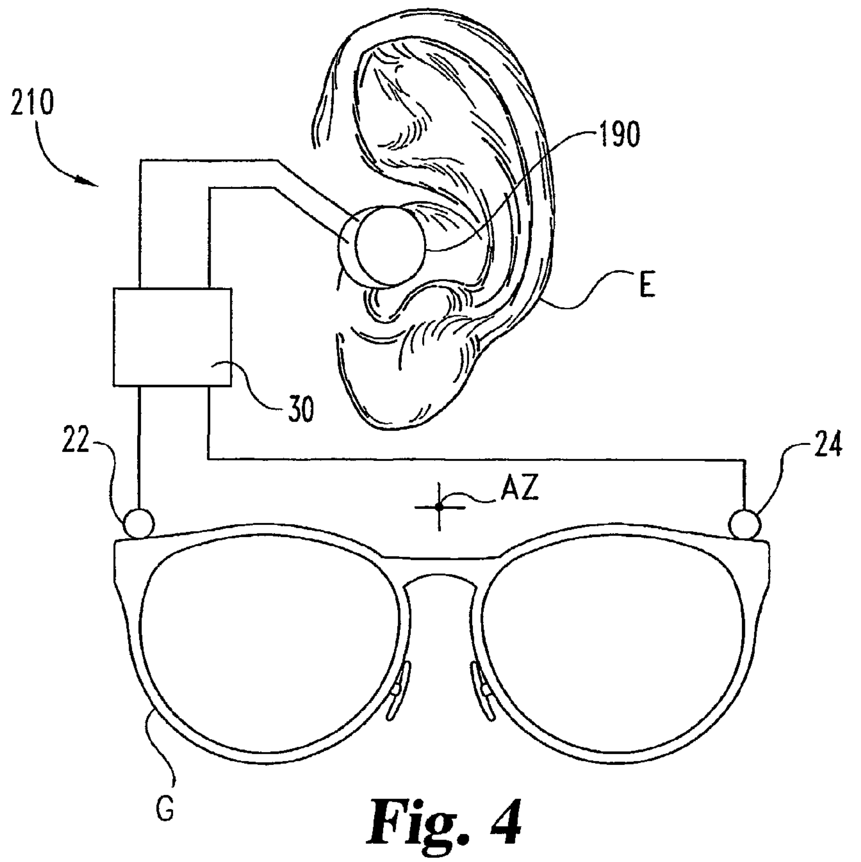
FIGS. 4 and 5 depict other embodiments of the present invention corresponding to hearing aid and computer voice recognition applications of the system of FIG. 1, respectively.

Referring to FIG. 4, one application of the various embodiments of the present invention is depicted as hearing aid system 210; where like reference numerals refer to like features. In one embodiment, system 210 includes eyeglasses G and acoustic sensors 22 and 24. Acoustic sensors 22 and 24 are fixed to eyeglasses G in this embodiment and spaced apart from one another, and are operatively coupled to processor 30. Processor 30 is operatively coupled to output device 190. Output device 190 is in the form of a hearing aid earphone and is positioned in ear E of the user to provide a corresponding audio signal. For system 210, processor 30 is configured to perform routine 140 or its variants with the output signal y(t) being provided to output device 190 instead of output device 90 of FIG. 2. As previously discussed, an additional output device 190 can be coupled to processor 30 to provide sound to another ear (not shown). This arrangement defines axis AZ to be perpendicular to the view plane of FIG. 4 as designated by the like labeled cross-hairs located generally midway between sensors 22 and 24.

In operation, the user wearing eyeglasses G can selectively receive an acoustic signal by aligning the corresponding source with a designated direction, such as axis AZ. As a result, sources from other directions are attenuated. Moreover, the wearer may select a different signal by realigning axis AZ with another desired sound source and correspondingly suppress a different set of off-axis sources. Alternatively or additionally, system 210 can be configured to operate with a reception direction that is not coincident with axis AZ.

Processor 30 and output device 190 may be separate units (as depicted) or included in a common unit worn in the ear. The coupling between processor 30 and output device 190 may be an electrical cable or a wireless transmission. In one alternative embodiment, sensors 22, 24 and processor 30 are remotely located relative to each other and are configured to broadcast to one or more output devices 190 situated in the ear E via a radio frequency transmission.

In a further hearing aid embodiment, sensors 22, 24 are sized and shaped to fit in the ear of a listener, and the processor algorithms are adjusted to account for shadowing caused by the head, torso, and pinnae. This adjustment may be provided by deriving a Head-Related-Transfer-Function (HRTF) specific to the listener or from a population average using techniques known to those skilled in the art. This function is then used to provide appropriate weightings of the output signals that compensate for shadowing.

Another hearing aid system embodiment is based on a cochlear implant. A cochlear implant is typically disposed in a middle ear passage of a user and is configured to provide electrical stimulation signals along the middle ear in a standard manner. The implant can include some or all of processing subsystem 30 to operate in accordance with the teachings of the present invention. Alternatively or additionally, one or more external modules include some or all of subsystem 30. Typically a sensor array associated with a hearing aid system based on a cochlear implant is worn externally, being arranged to communicate with the implant through wires, cables, and/or by using a wireless technique.

Figure 5:
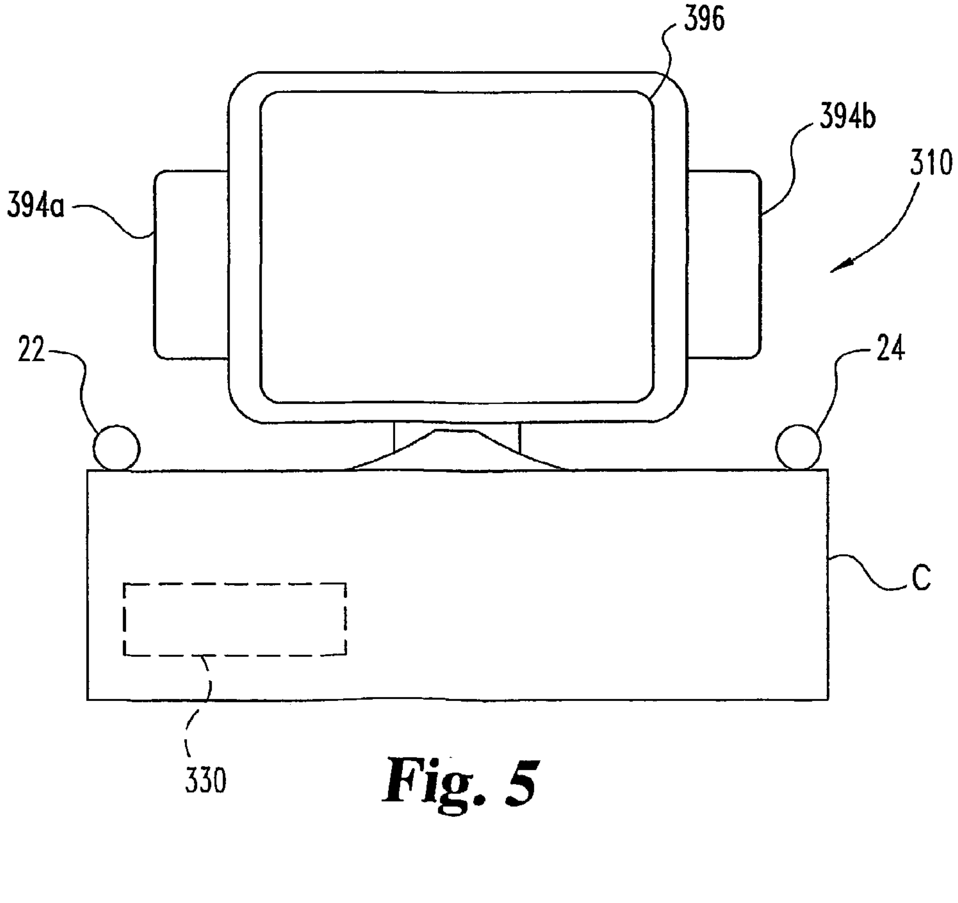
Figure 10:
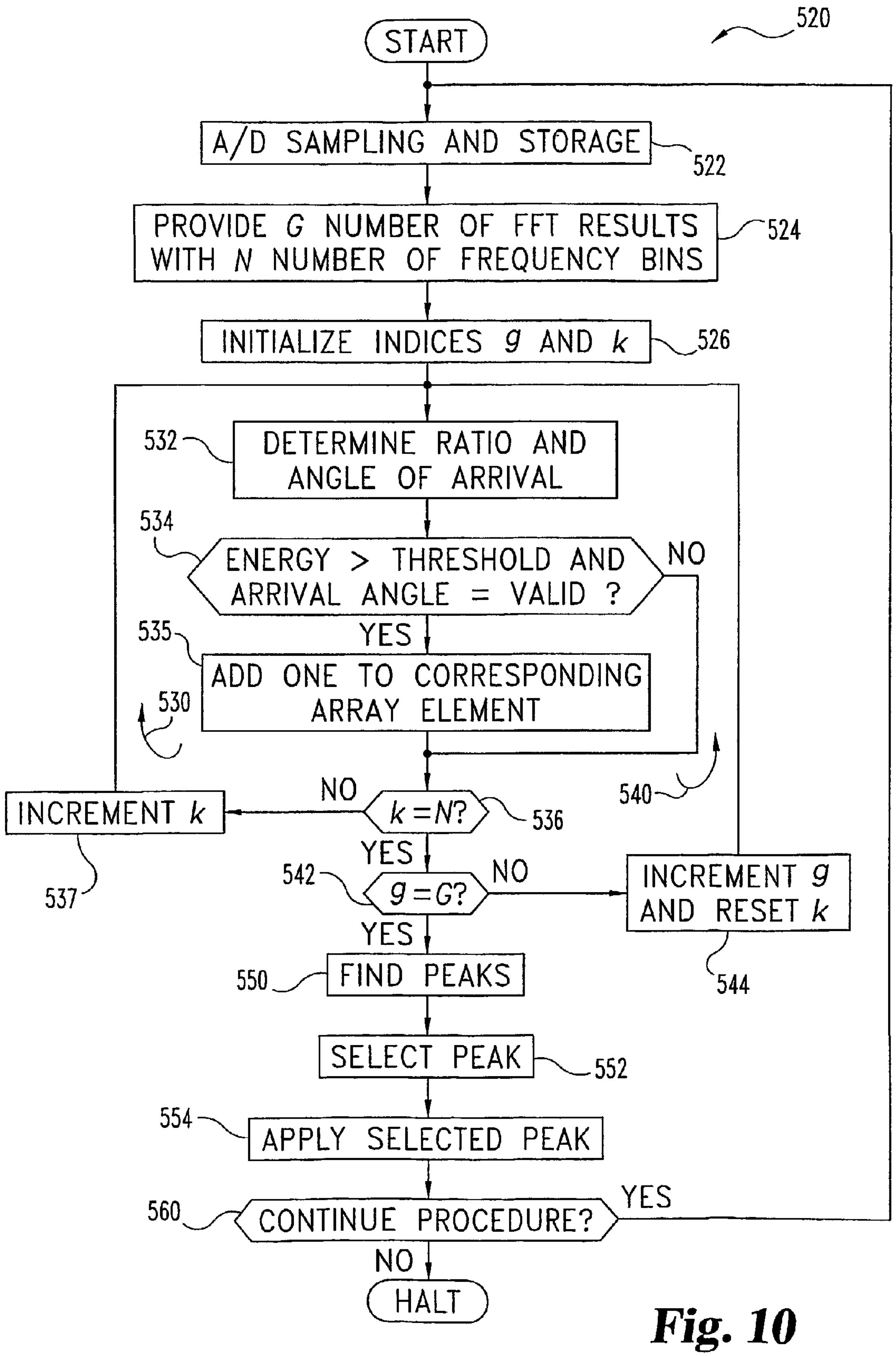
FIG. 10 is a flowchart of a procedure that can be performed with the system of FIG. 1 either with or without the routine of FIG. 3.

Besides various forms of hearing aids, the present invention can be applied in other configurations. For instance, FIG. 5 shows a voice input device 310 employing the present invention as a front end speech enhancement device for a voice recognition routine for personal computer C; where like reference numerals refer to like features. Device 310 includes acoustic sensors 22, 24 spaced apart from each other in a predetermined relationship. Sensors 22, 24 are operatively coupled to processor 330 within computer C. Processor 330 provides an output signal for internal use or responsive reply via speakers 394*a*, 394*b* and/or visual display 396; and is arranged to process vocal inputs from sensors 22, 24 in accordance with routine 140 or its variants. In one mode of operation, a user of computer C aligns with a predetermined axis to deliver voice inputs to device 310. In another mode of operation, device 310 changes its monitoring direction based on feedback from an operator and/or automatically selects a monitoring direction based on the location of the most intense sound source over a selected period of time. Alternatively or additionally, the source localization/tracking ability provided by procedure 520 as illustrated in the flowchart of FIG. 10 can be utilized. In still another voice input application, the directionally selective speech processing features of the present invention are utilized to enhance performance of a hands-free telephone, audio surveillance device, or other audio system.

Under certain circumstances, the directional orientation of a sensor array relative to the target acoustic source changes. Without accounting for such changes, attenuation of the target signal can result. This situation can arise, for example, when a binaural hearing aid wearer turns his or her head so that he or she is not aligned properly with the target source, and the hearing aid does not otherwise account for this misalignment. It has been found that attenuation due to misalignment can be reduced by localizing and/or tracking one or more acoustic sources of interests. The flowchart of FIG. 10 illustrates procedure 520 to track and/or localize a desired acoustic source relative to a reference. Procedure 520 can be utilized for a hearing aid or in other applications such as a voice input device, a hands-free telephone, audio surveillance equipment, and the like—either in conjunction with or independent of previously described embodiments. Procedure 520 is described as follows in terms of an implementation with system 10 of FIG. 1. For this embodiment, processing system 30 can include logic to execute one or more stages and/or conditionals of procedure 520 as appropriate. In other embodiments, a different arrangement can be used to implement procedure 520 as would occur to one skilled in the art.

Procedure 520 starts with A/D conversion in stage 522 in a manner like that described for stage 142 of routine 140. From stage 522, procedure 520 continues with stage 524 to transform the digital data obtained from stage 522, such that "G" number of FFTs are provided each with "N" number of FFT frequency bins. Stages 522 and 524 can be executed in an ongoing fashion, buffering the results periodically for later access by other operations of procedure 520 in a parallel, pipelined, sequence-specific, or different manner as would occur to one skilled in the art. With the FFTs from stage 524, an array of localization results, P(γ), can be described in terms of relationships (31)-(35) as follows:

$$P(\gamma) = \sum_{g=1}^{G}\left[\sum_{k=0}^{\frac{N}{2}-1}\sum_{n} d(\theta_x)\right], \quad (31)$$

$$\gamma = [-90°, -89°, -88°, \ldots, 89°, 90°]$$

$$n = \left[0, \ldots, INT\left(\frac{D \cdot f_s}{c}\right)\right] \quad (32)$$

$$d(\theta_x) = 1,\ \theta_x \in \gamma \text{ and } |x(g,k)| \leqq 1 \text{ and } |L(g,k)| + |R(g,k)| \geqq M_{thr}(k)$$

$$= 0,\ \theta_x \notin \gamma \text{ or } |x(g,k)| > 1 \text{ or } |L(g,k)| + |R(g,k)| < M_{thr}(k) \quad (33)$$

$$\theta_x = \mathrm{ROUND}(\sin^{-1}(x(g,k))) \quad (34)$$

$$x(g,k) = \frac{N \cdot c}{2\pi \cdot k \cdot f_s \cdot D}(<L(g,k) - <R(g,k) \pm 2\pi n) \quad (35)$$

where the operator "INT" returns the integer part of its operand, L(g,k) and R(g,k) are the frequency-domain data from channels L and R, respectively, for the $k^{th}$ FFT frequency bin of the $g^{th}$ FFT, $M_{thr}(k)$ is a threshold value for the frequency-domain data in FFT frequency bin k, the operator "ROUND" returns the nearest integer degree of its operand, c is the speed of sound in meters per second, $f_S$ is the sampling rate in Hertz, and D is the distance (in meters) between the two sensors of array 20. For these relationships, array P(γ) is defined with 181 azimuth location elements, which correspond to directions −90° to +90° in 10 increments. In other embodiments, a different resolution and/or location indication technique can be used.

From stage 524, procedure 520 continues with index initialization stage 526 in which index g to the G number of FFTs and index k to the N frequency bins of each FFT are set to one and zero, (g=1, k=0), respectively. From stage 526, procedure 520 continues by entering frequency bin processing loop 530 and FFT processing loop 540. For this example, loop 530 is nested within loop 540. Loops 530 and 540 begin with stage 532.

For an off-axis acoustic source, the corresponding signal travels different distances to reach each of the sensors 22, 24 of array 20. Generally, these different distances cause a phase difference between channels L and R at some frequency. In stage 532, routine 520 determines the difference in phase between channels L and R for the current frequency bin k of the FFT g, converts the phase difference to a difference in distance, and determines the ratio x(g,k) of this distance difference to the sensor spacing D in accordance with relationship (35). Ratio x(g,k) is used to find the signal angle of arrival $\theta_x$, rounded to the nearest degree, in accordance with relationship (34).

Conditional 534 is next encountered to test whether the signal energy level in channels L and R have more energy than a threshold level $M_{thr}$, and the value of x(g,k) was one for which a valid angle of arrival could be calculated. If both conditions are met, then in stage 535 a value of one is added to the corresponding element of P(γ), where $\gamma=\theta_x$. Procedure 520 proceeds from stage 535 to conditional 536. If neither condition of conditional 534 is met, then P(γ) is not modified, and procedure 520 bypasses stage 535, continuing with conditional 536.

Conditional 536 tests if all the frequency bins have been processed, that is whether index k equals N, the total number of bins. If not (conditional 536 test is negative), procedure 520 continues with stage 537 in which index k is incremented by one (k=k+1). From stage 537, loop 530 closes, returning to stage 532 to process the new g and k combination. If the conditional 536 test is affirmative, conditional 542 is next encountered, which tests if all FIF's have been processed, that is whether index g equals G number of FFTs. If not (conditional 542 is negative), procedure 520 continues with stage 544 to increment g by one (g=g+1) and to reset k to zero (k=0). From stage 544, loop 540 closes, returning to stage 532 to process the new g and k combination. If conditional test 542 is affirmative, then all N bins for each of the G number of FFTs have been processed, and loops 530 and 540 are exited.

With the conclusion of processing by loops 530 and 540, the elements of array P(γ) provide a measure of the likelihood that an acoustic source corresponds to a given direction (azimuth in this case). By examining P(γ), an estimate of the spatial distribution of acoustic sources at a given moment in time is obtained. From loops 530, 540, procedure 520 continues with stage 550.

In stage 550, the elements of array P(y) having the greatest relative values, or "peaks," are identified in accordance with relationship (36) as follows:

$$p(l) = \mathrm{PEAKS}(P(\gamma), \gamma_{lim}, P_{thr}) \quad (36)$$

where p(l) is direction of the $l^{th}$ peak in the function P(γ) for values of γ between $\pm\gamma_{lim}$ (a typical value for $\gamma_{lim}$ is 10°, but this may vary significantly) and for which the peak values are above the threshold value $P_{thr}$. The PEAKS operation of relationship (36) can use a number of-peak-finding algorithms to locate maxima of the data, including optionally smoothing the data and other operations.

From stage 550, procedure 520 continues with stage 552 in which one or more peaks are selected. When tracking a source that was initially on-axis, the peak closest to the on-axis direction typically corresponds to the desired source. The selection of this closest peak can be performed in accordance with relationship (37) as follows:

$$\theta_{tar} = \min_{l} |p(l)| \tag{37}$$

where $\theta_{tar}$ is the direction angle of the chosen peak. Regardless of the selection criteria, procedure 520 proceeds to stage 554 to apply the selected peak or peaks. Procedure 520 continues from stage 554 to conditional 560. Conditional 560 tests whether procedure 520 is to continue or not. If the conditional 560 test is true, procedure 520 loops back to stage 522. If the conditional 560 test is false, procedure 520 halts.

In an application relating to routine 140, the peak closest to axis AZ is selected, and utilized to steer array 20 by adjusting steering vector e. In this application, vector e is modified for each frequency bin k so that it corresponds to the closest peak direction $\theta_{tar}$. For a steering direction of $\theta_{tar}$, the vector e can be represented by the following relationship (38), which is a simplified version of relationships (8) and (9):

$$\begin{aligned} e &= [1 e^{+j\phi k}]^T \\ &= \left( \frac{2\pi \cdot D \cdot f_s}{c \cdot N} \cdot \sin(\theta_{tar}) \right) \end{aligned} \tag{38}$$

where k is the FFT frequency bin number, D is the distance in meters between sensors 22 and 24, $f_s$ is the sampling frequency in Hertz, c is the speed of sound in meters per second, N is the number of FFT frequency bins and $\theta_{tar}$ is obtained from relationship (37). For routine 140, the modified steering vector e of relationship (38) can be substituted into relationship (4) of routine 140 to extract a signal originating from direction $\theta_{tar}$. Likewise, procedure 520 can be integrated with routine 140 to perform localization with the same FFT data. In other words, the A/D conversion of stage 142 can be used to provide digital data for subsequent processing by both routine 140 and procedure 520. Alternatively or additionally, some or all of the FFTs obtained for routine 140 can be used to provide the G FFTs for procedure 520. Moreover, beamwidth modifications can be combined with procedure 520 in various applications either with or without routine 140. In still other embodiments, the indexed execution of loops 530 and 540 can be at least partially performed in parallel with or without routine 140.

In a further embodiment, one or more transformation techniques are utilized in addition to or as an alternative to fourier transforms in one or more forms of the invention previously described. One example is the wavelet transform, which mathematically breaks up the time-domain waveform into many simple waveforms, which may vary widely in shape. Typically wavelet basis functions are similarly shaped signals with logarithmically spaced frequencies. As frequency rises, the basis functions become shorter in time duration with the inverse of frequency. Like fourier transforms, wavelet transforms represent the processed signal with several different components that retain amplitude and phase information. Accordingly, routine 140 and/or routine 520 can be adapted to use such alternative or additional transformation techniques. In general, any signal transform components that provide amplitude and/or phase information about different parts of an input signal and have a corresponding inverse transformation can be applied in addition to or in place of FFTs.

Routine 140 and the variations previously described generally adapt more quickly to signal changes than conventional time-domain iterative-adaptive schemes. In certain applications where the input signal changes rapidly over a small interval of time, it may be desired to be more responsive to such changes. For these applications, the F number of FFTs associated with correlation matrix R(k) may provide a more desirable result if it is not constant for all signals (alternatively designated the correlation length F). Generally, a smaller correlation length F is best for rapidly changing input signals, while a larger correlation length F is best for slowly changing input signals.

A varying correlation length F can be implemented in a number of ways. In one example, filter weights are determined using different parts of the frequency-domain data stored in the correlation buffers. For buffer storage in the order of the time they are obtained (First-In, First-Out (FIFO) storage), the first half of the correlation buffer contains data obtained from the first half of the subject time interval and the second half of the buffer contains data from the second half of this time interval. Accordingly, the correlation matrices $R_1$(k) and $R_2$(k) can be determined for each buffer half according to relationships (39) and (40) as follows:

$$R_1(k) = \begin{bmatrix} \frac{2M}{F} \sum_{n=1}^{\frac{F}{2}} X_l^*(n, k) X_l(n, k) & \frac{2}{F} \sum_{n=1}^{\frac{F}{2}} X_l^*(n, k) X_r(n, k) \\ \frac{2}{F} \sum_{n=1}^{\frac{F}{2}} X_r^*(n, k) X_l(n, k) & \frac{2M}{F} \sum_{n=1}^{\frac{F}{2}} X_r^*(n, k) X_r(n, k) \end{bmatrix} \tag{39}$$

$$R_2(k) = \begin{bmatrix} \frac{2M}{F} \sum_{n=\frac{F}{2}+1}^{F} X_l^*(n, k) X_l(n, k) & \frac{2}{F} \sum_{n=\frac{F}{2}+1}^{F} X_l^*(n, k) X_r(n, k) \\ \frac{2}{F} \sum_{n=\frac{F}{2}+1}^{F} X_r^*(n, k) X_l(n, k) & \frac{2M}{F} \sum_{n=\frac{F}{2}+1}^{F} X_r^*(n, k) X_r(n, k) \end{bmatrix} \tag{40}$$

R(k) can be obtained by summing correlation matrices $R_1$(k) and $R_2$(k).

Using relationship (4) of routine 140, filter coefficients (weights) can be obtained using both $R_1$(k) and $R_2$(k). If the weights differ significantly for some frequency band k between $R_1$(k) and $R_2$(k), a significant change in signal statistics may be indicated. This change can be quantified by examining the change in one weight through determining the magnitude and phase change of the weight and then using these quantities in a function to select the appropriate correlation length F. The magnitude difference is defined according to relationship (41) as follows:

$$\Delta M(k) = ||w_{1,1}(k)| - |w_{1,2}(k)|| \tag{41}$$

where $w_{1,1}$(k) and $w_{1,2}$(k) are the weights calculated for the left channel using $R_1$(k) and $R_2$(k), respectively. The angle difference is defined according to relationship (42) as follows:

$$\Delta A(k)=|\min(a_1-\angle w_{L2}(k),\ a_2-\angle w_{L2}(k),\ a_3-\angle w_{L2}(k))|$$

$$a_1=\angle w_{L1}(k)$$

$$a_2=\angle w_{L1}(k)+2\pi$$

$$a_3=\angle w_{L1}(k)-2\pi \quad (42)$$

where the factor of $\pm 2\pi$ is introduced to provide the actual phase difference in the case of a $\pm 2\pi$ jump in the phase of one of the angles.

The correlation length F for some frequency bin k is now denoted as F(k). An example function is given by the following relationship (43):

$$F(k)=\max(b(k)\cdot\Delta A(k)+d(k)\cdot\Delta M(k)+c_{max}(k),\ c_{min}(k)) \quad (43)$$

where $c_{min}(k)$ represents the minimum correlation length, $c_{max}(k)$ represents the maximum correlation length and b(k) and d(k) are negative constants, all for the $k^{th}$ frequency band. Thus, as $\Delta A(k)$ and $\Delta M(k)$ increase, indicating a change in the data, the output of the function decreases. With proper choice of b(k) and d(k), F(k) is limited between $c_{min}(k)$ and $c_{max}(k)$, so that the correlation length can vary only within a predetermined range. It should also be understood that F(k) may take different forms, such as a nonlinear function or a function of other measures of the input signals.

Values for function F(k) are obtained for each frequency bin k. It is possible that a small number of correlation lengths may be used, so in each frequency bin k the correlation length that is closest to $F_1(k)$ is used to form R(k). This closest value is found using relationship (44) as follows:

$$i_{\min}=\min_i(|F_1(k)-c(i)|),\ \ c(i)=[c_{\min},\ c_2,\ c_3,\ \ldots,\ c_{\max}] \quad (44)$$

$$F(k)=c(i_{\min})$$

where $i_{min}$, is the index for the minimized function F(k) and c(i) is the set of possible correlation length values ranging from $c_{min}$ to $c_{max}$.

The adaptive correlation length process described in connection with relationships (39)-(44) can be incorporated into the correlation matrix stage 162 and weight determination stage 164 for use in a hearing aid, such as that described in connection with FIG. 4, or other applications like surveillance equipment, voice recognition systems, and hands-free telephones, just to name a few. Logic of processing subsystem 30 can be adjusted as appropriate to provide for this incorporation. Optionally, the adaptive correlation length process can be utilized with the relationship (29) approach to weight computation, the dynamic beamwidth regularization factor variation described in connection with relationship (30) and FIG. 9, the localization/tracking procedure 520, alternative transformation embodiments, and/or such different embodiments or variations of routine 140 as would occur to one skilled in the art. The application of adaptive correlation length can be operator selected and/or automatically applied based on one or more measured parameters as would occur to those skilled in the art.

Many other further embodiments of the present invention are envisioned. One further embodiment includes: detecting acoustic excitation with a number of acoustic sensors that provide a number of sensor signals; establishing a set of frequency components for each of the sensor signals; and determining an output signal representative of the acoustic excitation from a designated direction. This determination includes weighting the set of frequency components for each of the sensor signals to reduce variance of the output signal and provide a predefined gain of the acoustic excitation from the designated direction.

In another embodiment, a hearing aid includes a number of acoustic sensors in the presence of multiple acoustic sources that provide a corresponding number of sensor signals. A selected one of the acoustic sources is monitored. An output signal representative of the selected one of the acoustic sources is generated. This output signal is a weighted combination of the sensor signals that is calculated to minimize variance of the output signal.

A still further embodiment includes: operating a voice input device including a number of acoustic sensors that provide a corresponding number of sensor signals; determining a set of frequency components for each of the sensor signals; and generating an output signal representative of acoustic excitation from a designated direction. This output signal is a weighted combination of the set of frequency components for each of the sensor signals calculated to minimize variance of the output signal.

Yet a further embodiment includes an acoustic sensor array operable to detect acoustic excitation that includes two or more acoustic sensors each operable to provide a respective one of a number of sensor signals. Also included is a processor to determine a set of frequency components for each of the sensor signals and generate an output signal representative of the acoustic excitation from a designated direction. This output signal is calculated from a weighted combination of the set of frequency components for each of the sensor signals to reduce variance of the output signal subject to a gain constraint for the acoustic excitation from the designated direction.

A further embodiment includes: detecting acoustic excitation with a number of acoustic sensors that provide a corresponding number of signals; establishing a number of signal transform components for each of these signals; and determining an output signal representative of acoustic excitation from a designated direction. The signal transform components can be of the frequency domain type. Alternatively or additionally, a determination of the output signal can include weighting the components to reduce variance of the output signal and provide a predefined gain of the acoustic excitation from the designated direction.

In yet another embodiment, a hearing aid is operated that includes a number of acoustic sensors. These sensors provide a corresponding number of sensor signals. A direction is selected to monitor for acoustic excitation with the hearing aid. A set of signal transform components for each of the sensor signals is determined and a number of weight values are calculated as a function of a correlation of these components, an adjustment factor, and the selected direction. The signal transform components are weighted with the weight values to provide an output signal representative of the acoustic excitation emanating from the direction. The adjustment factor can be directed to correlation length or a beamwidth control parameter just to name a few examples.

For a further embodiment, a hearing aid is operated that includes a number of acoustic sensors to provide a corresponding number of sensor signals. A set of signal transform components are provided for each of the sensor signals and a number of weight values are calculated as a function of a correlation of the transform components for each of a number of different frequencies. This calculation includes applying a first beamwidth control value for a first one of the frequencies and a second beamwidth control value for a second one of the frequencies that is different than the first value. The signal transform components are weighted with the weight values to provide an output signal.

For another embodiment, acoustic sensors of the hearing aid provide corresponding signals that are represented by a plurality of signal transform components. A first set of weight values are calculated as a function of a first correlation of a first number of these components that correspond to a first correlation length. A second set of weight values are calculated as a function of a second correlation of a second number of these components that correspond to a second correlation length different than the first correlation length. An output signal is generated as a function of the first and second weight values.

In another embodiment, acoustic excitation is detected with a number of sensors that provide a corresponding number of sensor signals. A set of signal transform components is determined for each of these signals. At least one acoustic source is localized as a function of the transform components. In one form of this embodiment, the location of one or more acoustic sources can be tracked relative to a reference. Alternatively or additionally, an output signal can be provided as a function of the location of the acoustic source determined by localization and/or tracking, and a correlation of the transform components.

It is contemplated that various signal flow operators, converters, functional blocks, generators, units, stages, processes, and techniques may be altered, rearranged, substituted, deleted, duplicated, combined or added as would occur to those skilled in the art without departing from the spirit of the present inventions. It should be understood that the operations of any routine, procedure, or variant thereof can be executed in parallel, in a pipeline manner, in a specific sequence, as a combination of these appropriate to the interdependence of such operations on one another, or as would otherwise occur to those skilled in the art. By way of nonlimiting example, A/D conversion, D/A conversion, FFT generation, and FFT inversion can typically be performed as other operations are being executed. These other operations could be directed to processing of previously stored A/D or signal transform components, such as stages 150, 162, 164, 532, 535, 550, 552, and 554, just to name a few possibilities. In another nonlimiting example, the calculation of weights based on the current input signal can at least overlap the application of previously determined weights to a signal about to be output. All publications and patent applications cited in this specification are herein incorporated by reference as if each individual publication or patent application were specifically and individually indicated to be incorporated by reference.

Experimental Section

The following experimental results provide nonlimiting examples, and should not be construed to restrict the scope of the present invention.

Figure 6:
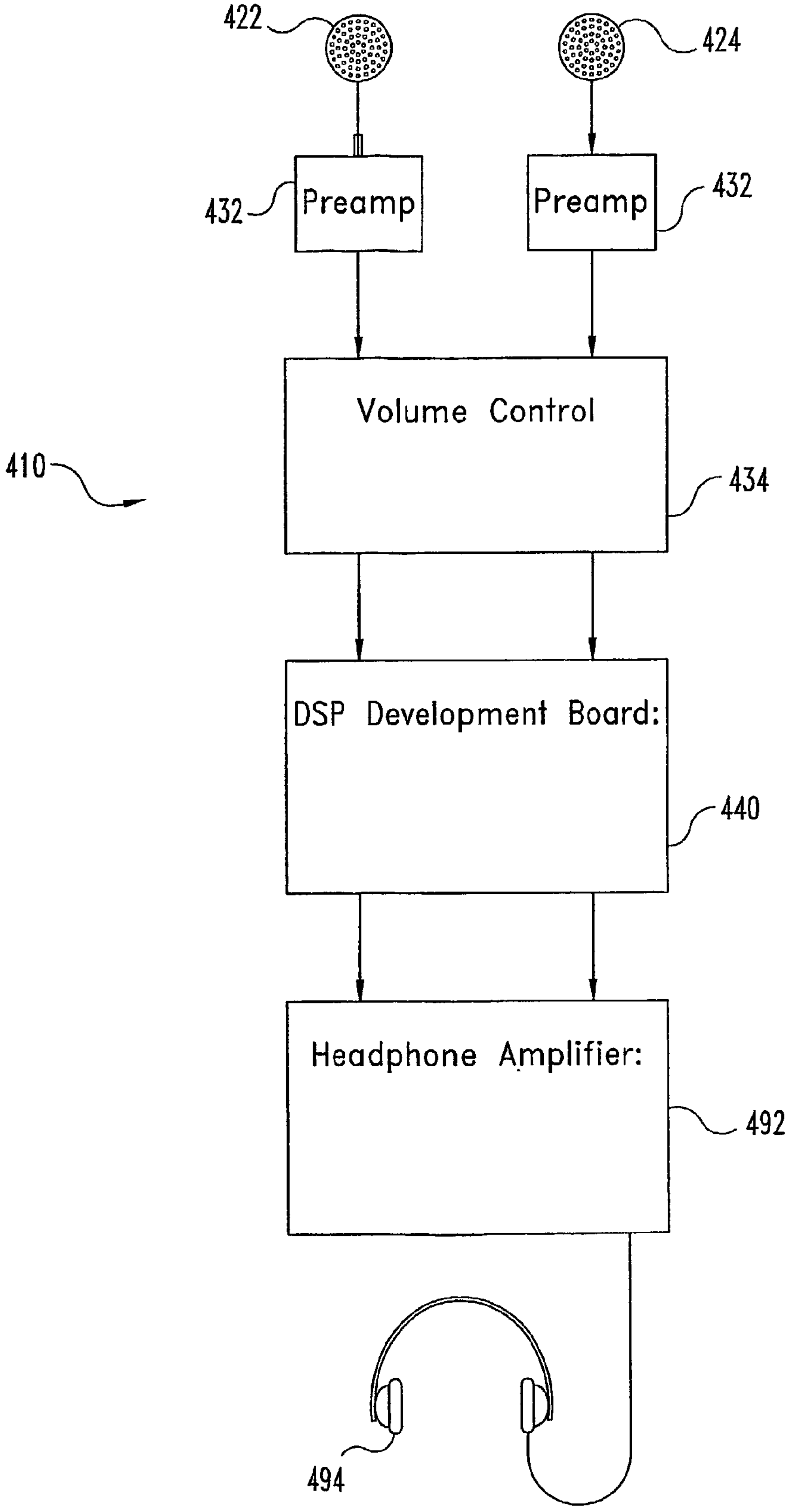
FIG. 6 is a diagrammatic view of an experimental setup of the system of FIG. 1.

FIG. 6 illustrates the experimental set-up for testing the present invention. The algorithm has been tested with real recorded speech signals, played through loudspeakers at different spatial locations relative to the receiving microphones in an anechoic chamber. A pair of microphones 422, 424 (Sennheiser MKE 2-60) with an inter-microphone distance D of 15 cm, were situated in a listening room to serve as sensors 22, 24. Various loudspeakers were placed at a distance of about 3 feet from the midpoint M of the microphones 422, 424 corresponding to different azimuths. One loudspeaker was situated in front of the microphones that intersected axis AZ to broadcast a target speech signal (corresponding to source 12 of FIG. 2). Several loudspeakers were used to broadcast words or sentences that interfere with the listening of target speech from different azimuths.

Microphones 422, 424 were each operatively coupled to a Mic-to-Line preamp 432 (Shure FP-11). The output of each preamp 432 was provided to a dual channel volume control 434 provided in the form of an audio preamplifier (Adcom GTP-5511). The output of volume control 434 was fed into A/D converters of a Digital Signal Processor (DSP) development board 440 provided by Texas Instruments (model number T1-C6201 DSP Evaluation Module (EVM)). Development board 440 includes a fixed-point DSP chip (model number TMS320C62) running at a clock speed of 133 MHz with a peak throughput of 1064 MIPS (millions of instructions per second). This DSP executed software configured to implement routine 140 in real-time. The sampling frequency for these experiments was about 8 kHz with 16-bit A/D and D/A conversion. The FFT length was 256 samples, with an FFT calculated every 16 samples. The computation leading to the characterization and extraction of the desired signal was found to introduce a delay in a range of about 10-20 milliseconds between the input and output.

Figure 7:
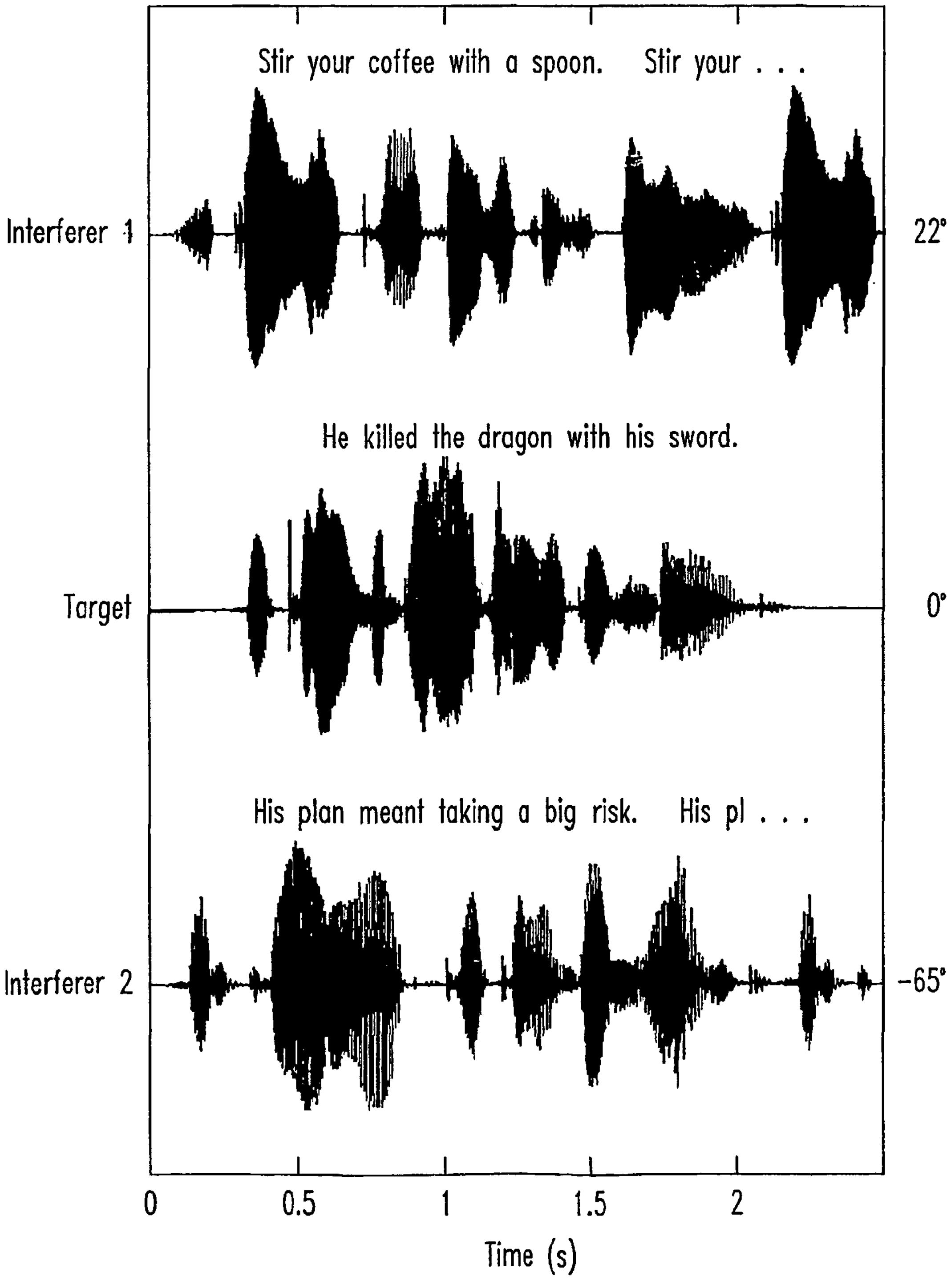
FIG. 7 is a graph of magnitude versus time of a target speech signal and two interfering speech signals.
Figure 8:
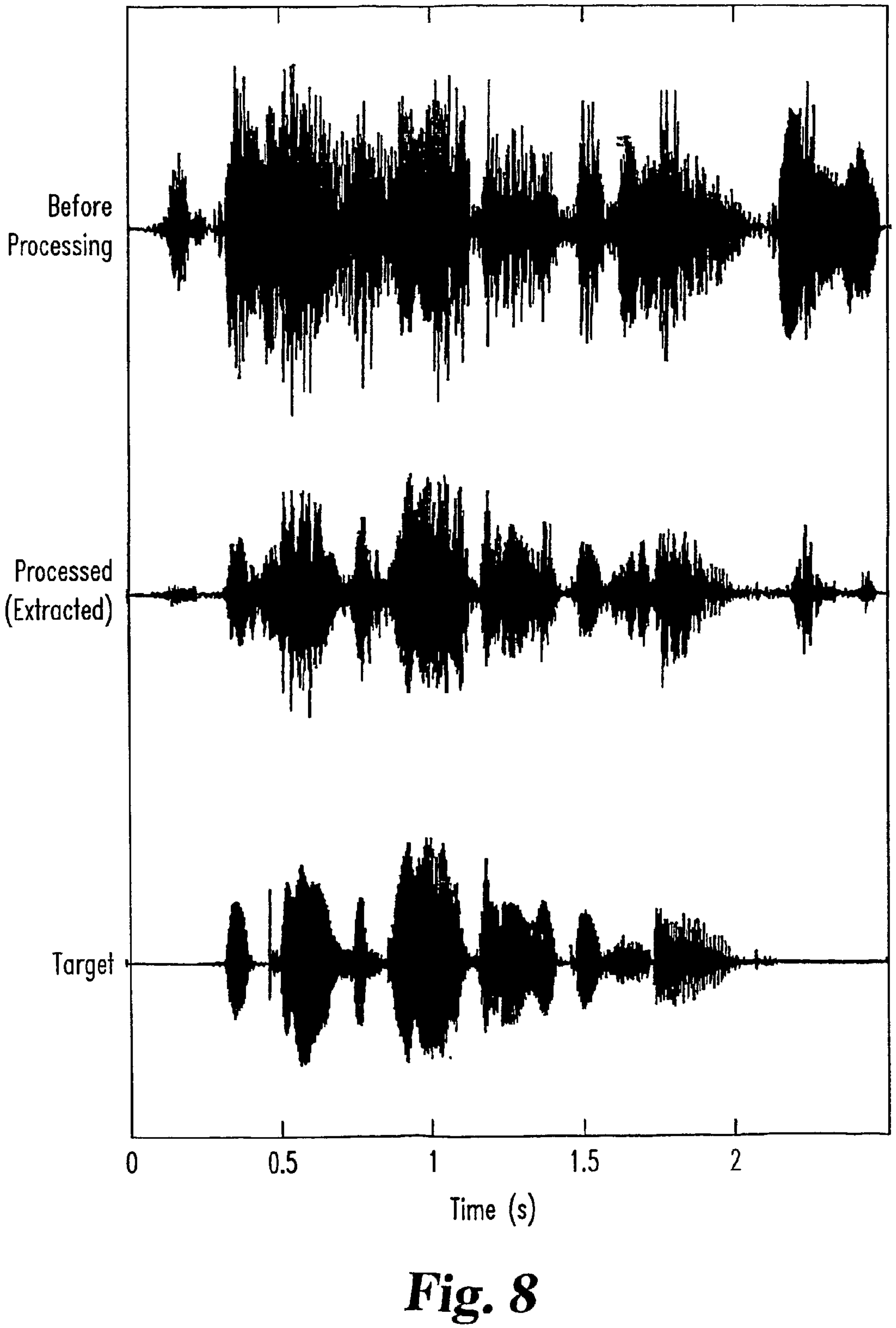
FIG. 8 is a graph of magnitude versus time of a composite of the speech signals of FIG. 7 before processing, an extracted signal corresponding to the target speech signal of FIG. 7, and a duplicate of the target speech signal of FIG. 7 for comparison.

FIGS. 7 and 8 each depict traces of three acoustic signals of approximately the same energy. In FIG. 7, the target signal trace is shown between two interfering signals traces broadcast from azimuths 22° and −65°, respectively. These azimuths are depicted in FIG. 1. The target sound is a prerecorded voice from a female (second trace), and is emitted by the loudspeaker located near 0°. One interfering sound is provided by a female talker (top trace of FIG. 7) and the other interfering sound is provided by a male talker (bottom trace of FIG. 7). The phrase repeated by the corresponding talker is reproduced above the respective trace.

Referring to FIG. 8, as revealed by the top trace, when the target speech sound is emitted in the presence of two interfering sources, its waveform (and power spectrum) is contaminated. This contaminated sound was difficult to understand for most listeners, especially those with hearing impairment. Routine 140, as embodied in board 440, processed this contaminated signal with high fidelity and extracted the target signal by markedly suppressing the interfering sounds. Accordingly, intelligibility of the target signal was restored as illustrated by the second trace. The intelligibility was significantly improved and the extracted signal resembled the original target signal reproduced for comparative purposes as the bottom trace of FIG. 8.

These experiments demonstrate marked suppression of interfering sounds. The use of the regularization parameter (valued at approximately 1.03) effectively limited the magnitude of the calculated weights and results in an output with much less audible distortion when the target source is slightly off-axis, as would occur when the hearing aid wearer's head is slightly misaligned to the target talker. Miniaturization of this technology to a size suitable for hearing aids and other applications can be provided using techniques known to those skilled in the art.

Figure 11:
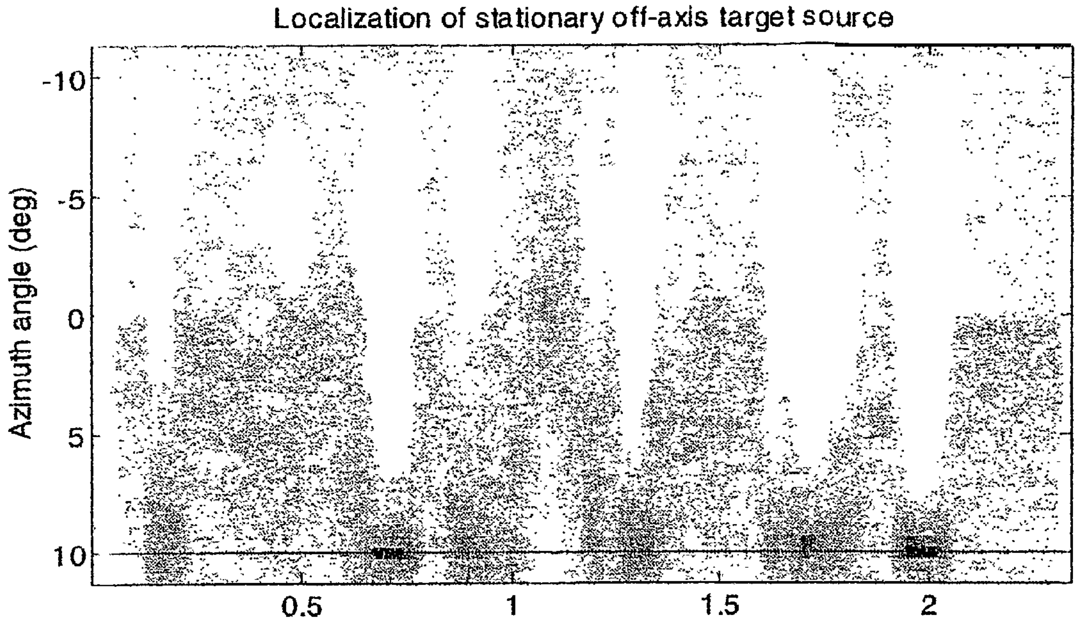
FIGS. 11 and 12 are graphs illustrating the efficacy of the procedure of FIG. 10.
Figure 12:
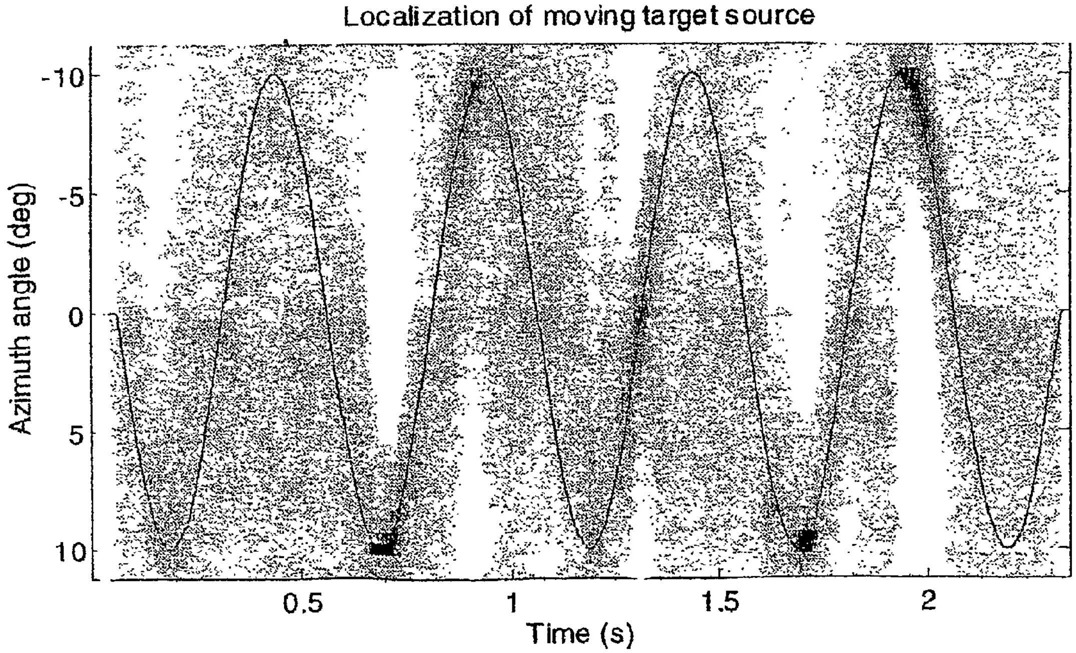

FIGS. 11 and 12 are computer generated image graphs of simulated results for procedure 520. These graphs plot localization results of azimuth in degrees versus time in seconds. The localization results are plotted as shading, where the darker the shading, the stronger the localization result at that angle and time. Such simulations are accepted by those skilled in the art to indicate efficacy of this type of procedure.

FIG. 11 illustrates the localization results when the target acoustic source is generally stationary with a direction of about 10° off-axis. The actual direction of the target is indicated by a solid black line. FIG. 12 illustrates the localization results for a target with a direction that is changing sinusoidally between +10° and −10°, as might be the case for a hearing aid wearer shaking his or her head. The actual location of the source is again indicated by a solid black line. The localization technique of procedure 520 accurately indicates the location of the target source in both cases because the darker shading matches closely to the actual location lines. Because the target source is not always producing a signal free of interference overlap, localization results may be strong only at certain times. In FIG. 12, these stronger intervals can be noted at about 0.2, 0.7, 0.9, 1.25, 1.7, and 2.0 seconds. It should be understood that the target location can be readily estimated between such times.

Experiments described herein are simply for the purpose of demonstrating operation of one form of a processing system of the present invention. The equipment, the speech materials, the talker configurations, and/or the parameters can be varied as would occur to those skilled in the art.

Any theory, mechanism of operation, proof, or finding stated herein is meant to further enhance understanding of the present invention and is not intended to make the present invention in any way dependent upon such theory, mechanism of operation, proof, or finding. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by the following claims are desired to be protected.

What is claimed is:

1. A method, comprising:

operating a hearing aid including a number of acoustic sensors, the acoustic sensors providing a corresponding number of sensor signals;

selecting a direction to monitor for acoustic excitation with the hearing aid;

determining a number of sets of signal transform components each providing a frequency domain form of a different one of the sensor signals;

calculating a number of sets of weight values as a function of a correlation of the sets of signal transform components, an adjustment factor, and the direction, the sets of weight values each being calculated to apply to a specific one of the sets of signal transform components; and weighting each one of the sets of signal transform components with a different one of the sets of weight values before combining the frequency domain form of the sensor signals with one another to provide an output signal representative of the acoustic excitation emanating from the direction.

2. The method of claim 1, wherein the transform components correspond to different frequencies and the adjustment factor has a first value for a first one of the frequencies and second value different than the first value for a second one of the frequencies to control beamwidth.

3. The method of claim 1, wherein the adjustment factor corresponds to correlation length and further comprising determining a number of different correlations with correlation length adaptively changed in accordance with different values for the adjustment factor.

4. The method of claim 1, further comprising:

determining a level of interference; and adjusting the beamwidth of the hearing aid in response to the level of interference with the adjustment factor.

5. The method of claim 1, further comprising:

determining a rate of change of at least one frequency of at least one of the sensor signals with respect to time; and adjusting the correlation length in response to the rate of change with the adjustment factor.

6. The method of claim 1, wherein said calculating is performed to minimize output variance.

7. The method of claim 1, further comprising localizing a selected acoustic source relative to a reference as a function of the transform components.

8. A method, comprising:

operating a hearing aid including a number of acoustic sensors, the acoustic sensors providing a corresponding number of sensor signals;

providing a set of signal transform components for each of the sensor signals;

calculating a number of weight values as a function of a correlation of the transform components for each of a number different frequencies, said calculating including applying a first beamwidth control value for a first one of the frequencies and a second beamwidth control value for a second one of the frequencies different than the first beamwidth control value; and weighting the signal transform components with the weight values to provide an output signal.

9. The method of claim 8, further comprising selecting the first beamwidth value and the second beamwidth value to provide a generally constant beamwidth of the hearing aid over a predefined frequency range.

10. The method of claim 8, wherein the first beamwidth value and the second beamwidth value differ in accordance with a difference in an amount of interference at the first one of the frequencies relative to the second one of the frequencies.

11. The method of claim 8, wherein said calculating is performed to minimize output variance.

12. The method of claim 8, further comprising localizing a selected acoustic source relative to a reference as a function of the transform components.

13. A method, comprising:

operating a hearing aid including a number of acoustic sensors, the acoustic sensors providing a corresponding number of sensor signals;

providing a plurality of signal transform components for each of the sensor signals;

calculating a first set of weight values as a function of a first correlation of a first number of the signal transform components corresponding to a first correlation length and a second set of weight values as a function of a second correlation of a second number of the signal transform components corresponding to a second correlation length different that the first correlation length; and generating an output signal as a function of the first weight values and the second weight values.

14. The method of claim 13, wherein the number of sensors is two and the hearing aid has a single, monaural output.

15. The method of claim 13, wherein said calculating is performed to minimize output variance.

16. The method of claim 13, further comprising localizing a selected acoustic source relative to a reference as a function of the transform components.

17. The method of claim 13, wherein the transform components are of a fourier type.

18. A method comprising:

detecting acoustic excitation with a number of acoustic sensors, the acoustic sensors providing a corresponding number of sensor signals;

establishing a set of signal transform components for each of the sensor signals;

as the acoustic source moves relative to the acoustic sensors, tracking location of the acoustic source relative to a reference as a function of the transform components, wherein said tracking includes generating an array with a number of elements each corresponding to a different azimuth and detecting one or more peak values among the elements of the array; and providing an output signal as a function of the location and a correlation of the transform components.

19. The method of claim 18, wherein the number of sensors is two and said tracking includes determining a phase difference between the sensor signals.

20. The method of claim 18, wherein the reference is a designated axis and the location is provided in the form of an azimuthal direction.

21. The method of claim 18, further comprising adjusting a beamwidth factor relative to frequency.

22. The method of claim 18, further comprising calculating a number of different correlation matrices and adaptively changing correlation length of one of the matrices relative to another of the matrices.

23. The method of claim 18, further comprising steering a direction-indicating vector corresponding to the location.

24. The method of claim 18, wherein said providing include generating the output signal by weighting the transform components to reduce variance of the output signal and provide a predefined gain.

25. An apparatus, comprising:

a first acoustic sensor operable to provide a first sensor signal;

a second acoustic sensor operable to provide a second sensor signal;

a processor operable to generate an output signal representative of acoustic excitation detected with said first acoustic sensor and said second acoustic sensor from a designated direction, said processor including:

means for transforming said first sensor signal to a first number of frequency domain transform components to provide a frequency domain form of said first sensor signal and said second sensor signal to a second number of frequency domain transform components to provide a frequency domain form of said second sensor signal, means for calculating a first set of weights specific to said frequency domain form of said first sensor signal and a second set of weights specific to said frequency domain form of said second sensor signal; and means for weighting said first transform components with said first set of weights to provide a corresponding number of first weighted components and said second transform components with said second set of weights to provide a corresponding number of second weighted components as a function of statistical variance of said output signal and a gain constraint for the acoustic excitation from said designated direction, means for combining each of said first weighted components with a corresponding one of said second weighted components to provide a frequency domain form of said output signal; and means for providing a time domain form of said output signal from said frequency domain form.

26. The apparatus of claim 25, wherein said processor includes means for steering said designated direction.

27. The apparatus of claim 25, further comprising at least one acoustic output device responsive to said output signal.

28. The apparatus of claim 25, wherein the apparatus is arranged as a hearing aid.

29. The apparatus of claim 25, wherein the apparatus is arranged as a voice input device.

30. The apparatus of claim 25, wherein said processor is operable to localize an acoustic excitation source relative to a reference.

31. The apparatus of claim 25, wherein said processor is operable to track location of an acoustic excitation source relative to an azimuthal plane.

32. The apparatus of claim 25, wherein said processor is operable to adjust a beamwidth control parameter with frequency.

33. The apparatus of claim 25, wherein said processor is operable to calculate a number of different correlation matrices and adaptively adjust correlation length of one or more of the matrices relative to at least one other of the matrices.

* * * * *